Dec. 23, 1941.  A. M. WOLF  2,267,066
MOTOR VEHICLE
Original Filed Sept. 25, 1935   12 Sheets-Sheet 2
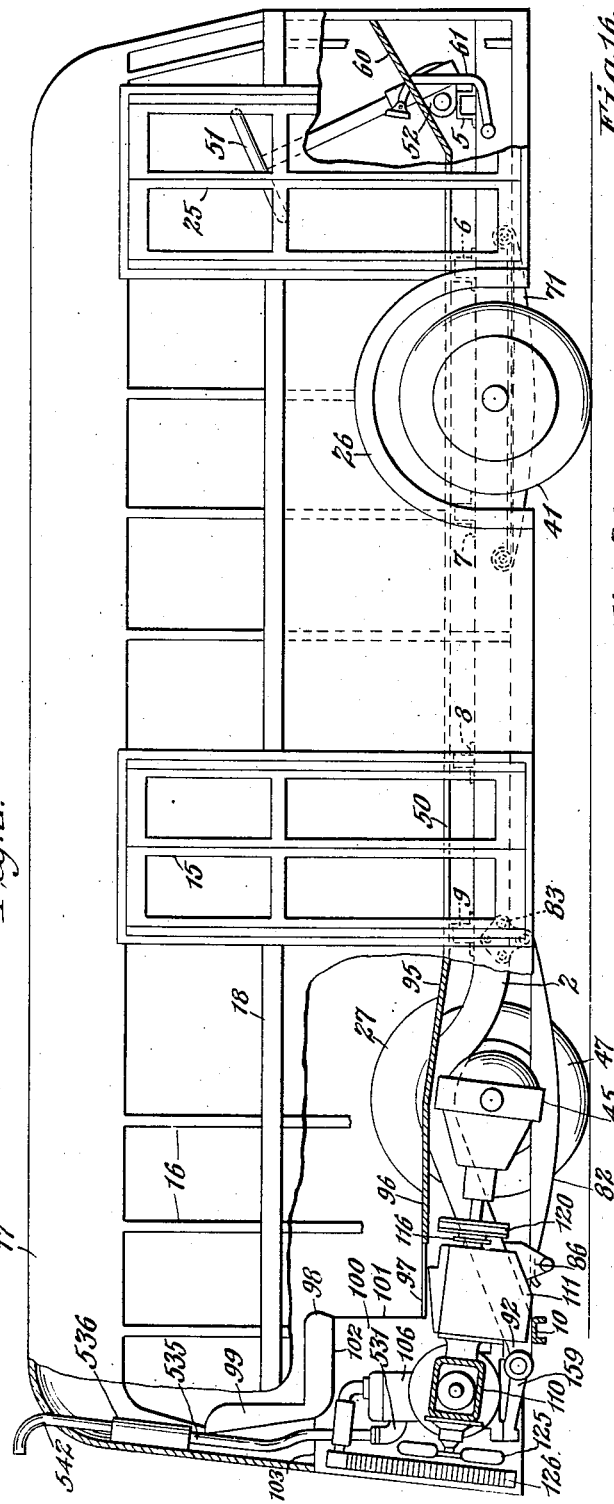
INVENTOR.
Austin M. Wolf,
BY M. C. Giddane
ATTORNEY.

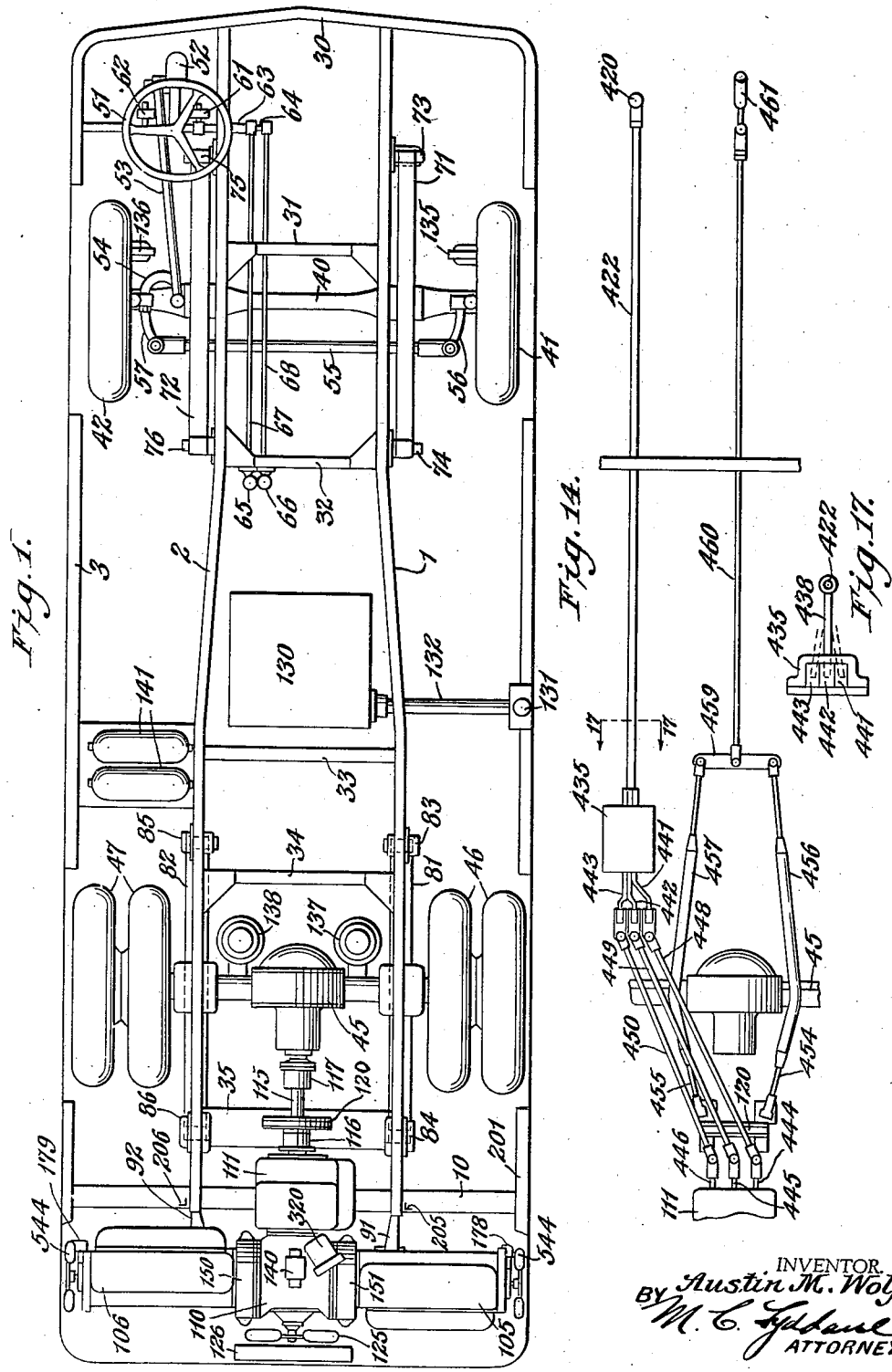

Dec. 23, 1941.    A. M. WOLF    2,267,066
MOTOR VEHICLE
Original Filed Sept. 25, 1935    12 Sheets-Sheet 3
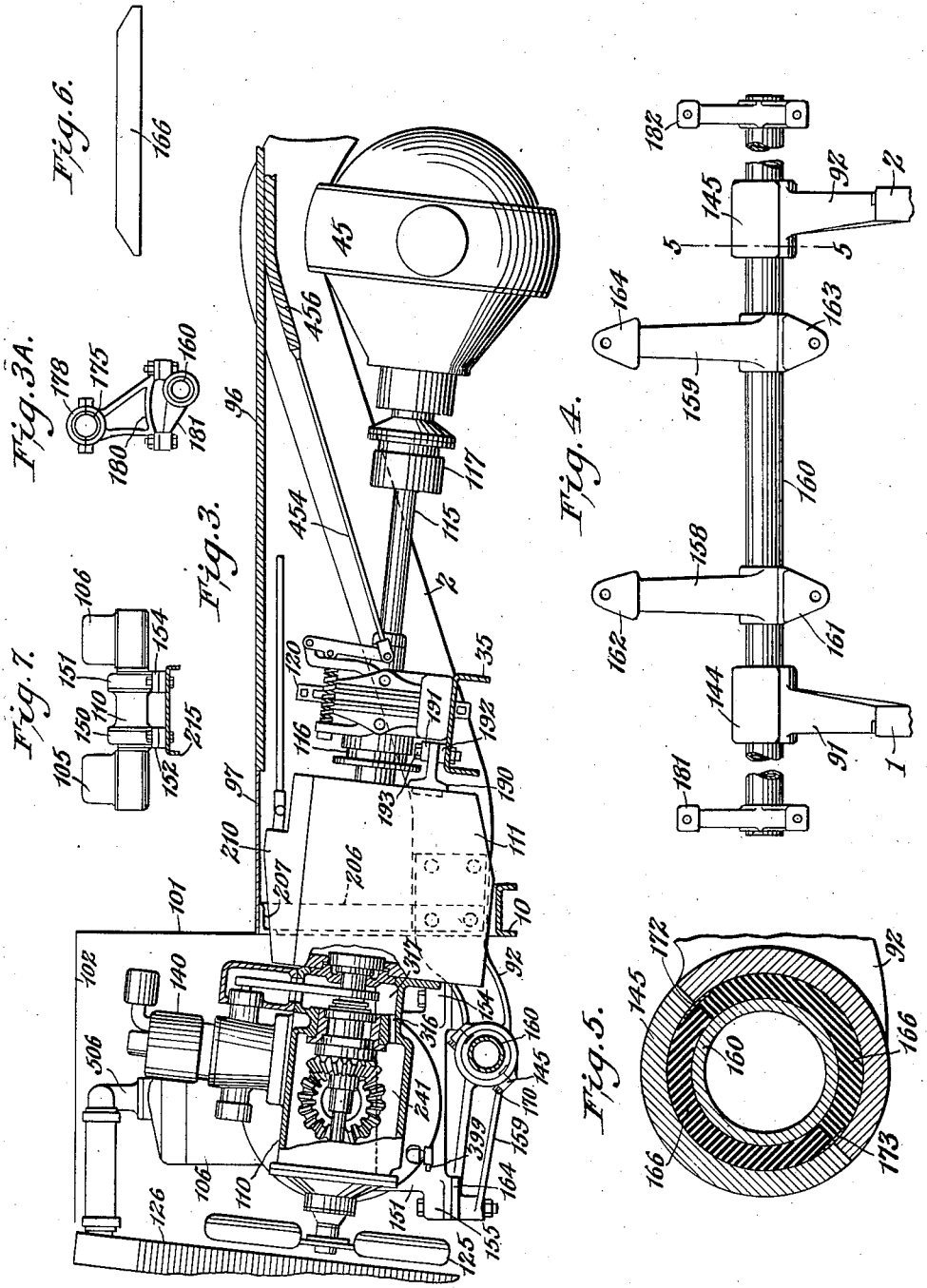
INVENTOR.
BY Austin M. Wolf,
M. C. Sydhane
ATTORNEY.

Dec. 23, 1941.   A. M. WOLF   2,267,066
MOTOR VEHICLE
Original Filed Sept. 25, 1935   12 Sheets-Sheet 4
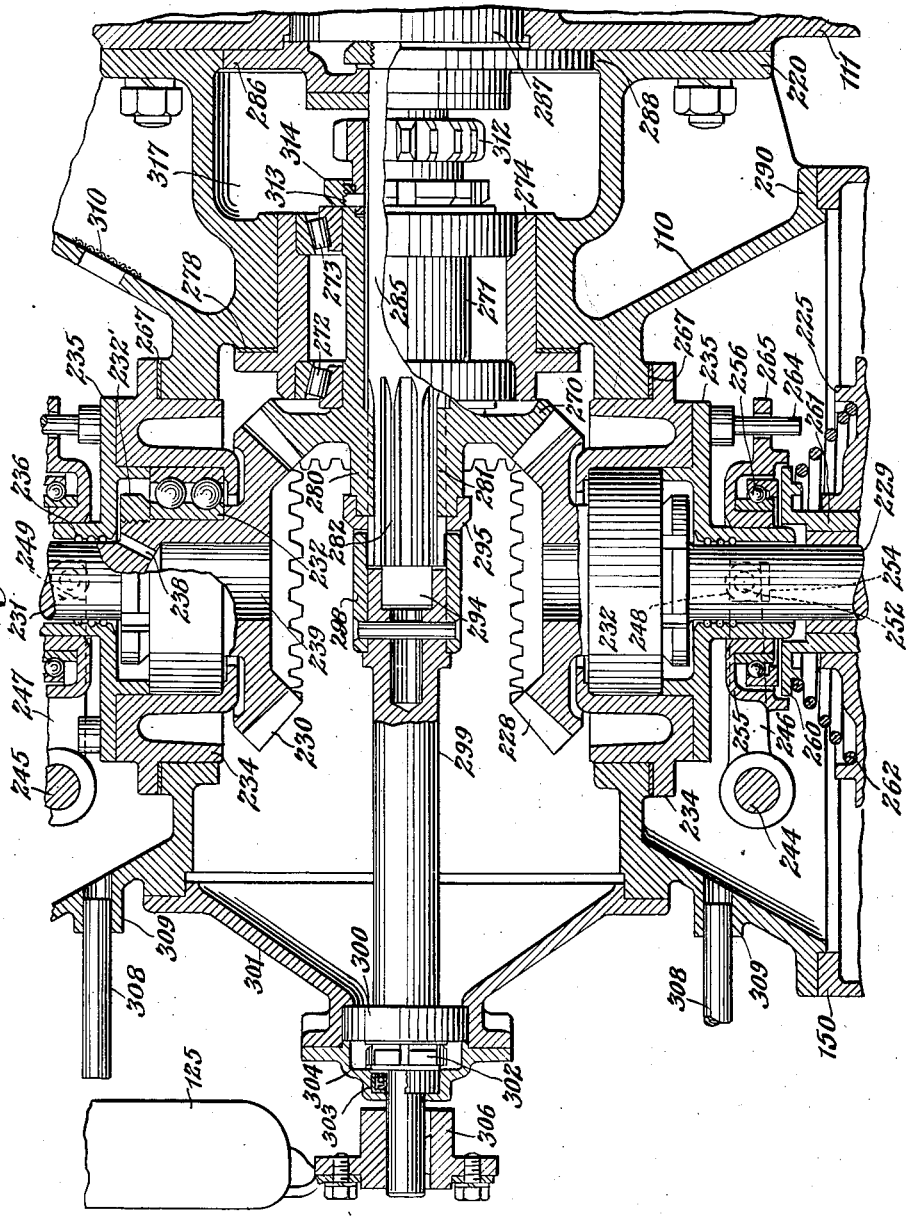
INVENTOR.
Austin M. Wolf,
BY M. C. Lyddane
ATTORNEY.

Dec. 23, 1941.  A. M. WOLF  2,267,066
MOTOR VEHICLE
Original Filed Sept. 25, 1935   12 Sheets-Sheet 5

INVENTOR.
Austin M. Wolf,
BY M. C. Lyddane,
ATTORNEY.

Dec. 23, 1941. A. M. WOLF 2,267,066
MOTOR VEHICLE
Original Filed Sept. 25, 1935 12 Sheets-Sheet 6

INVENTOR.
Christian M. Wolf

Dec. 23, 1941.  A. M. WOLF  2,267,066

MOTOR VEHICLE

Original Filed Sept. 25, 1935    12 Sheets-Sheet 7

INVENTOR
Austin M. Wolf

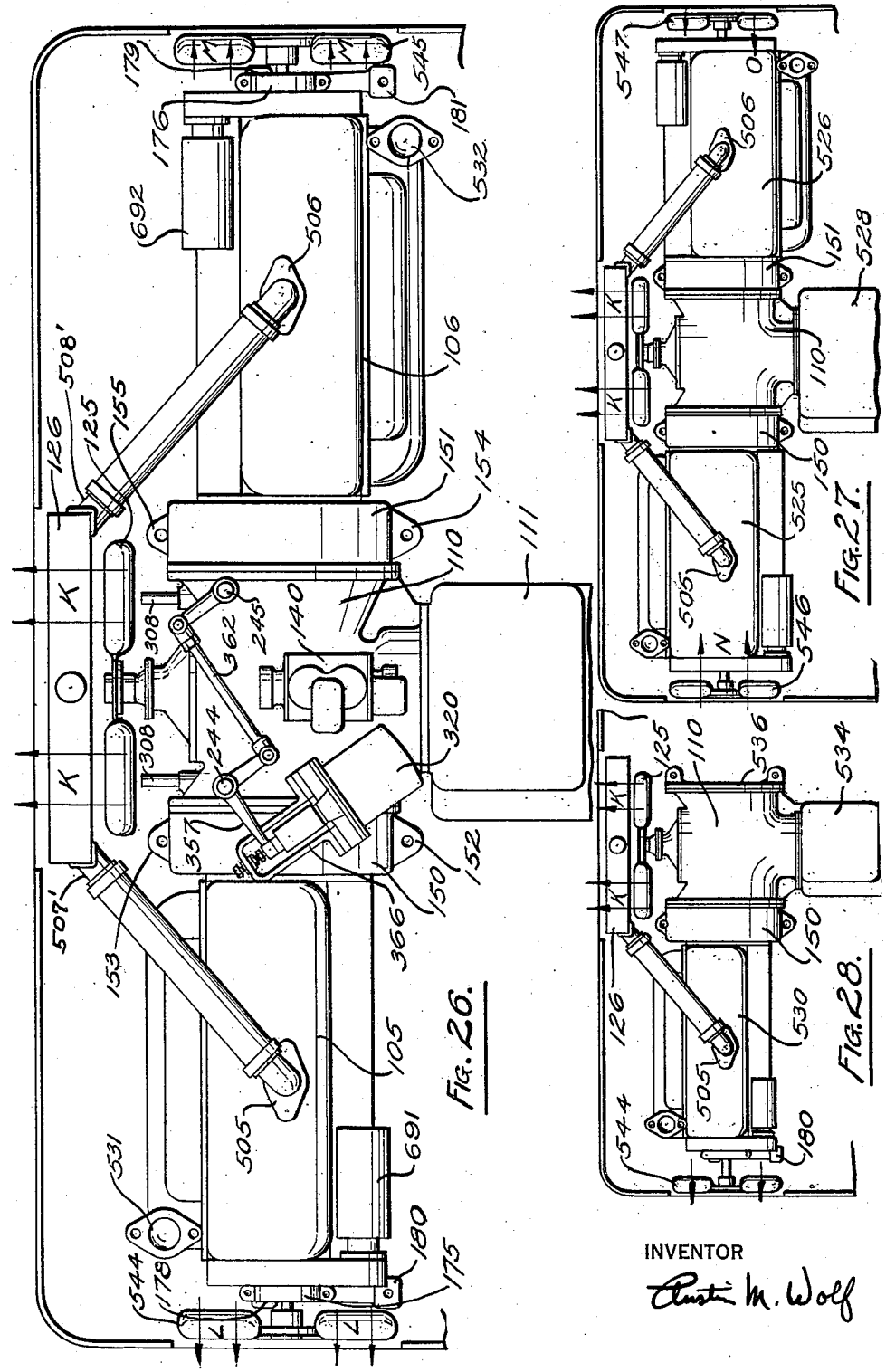

Dec. 23, 1941.   A. M. WOLF   2,267,066
MOTOR VEHICLE
Original Filed Sept. 25, 1935   12 Sheets-Sheet 9

INVENTOR
Austin M. Wolf

Dec. 23, 1941.                A. M. WOLF                 2,267,066
                             MOTOR VEHICLE
                 Original Filed Sept. 25, 1935    12 Sheets-Sheet 10

INVENTOR
Christian M. Wolf

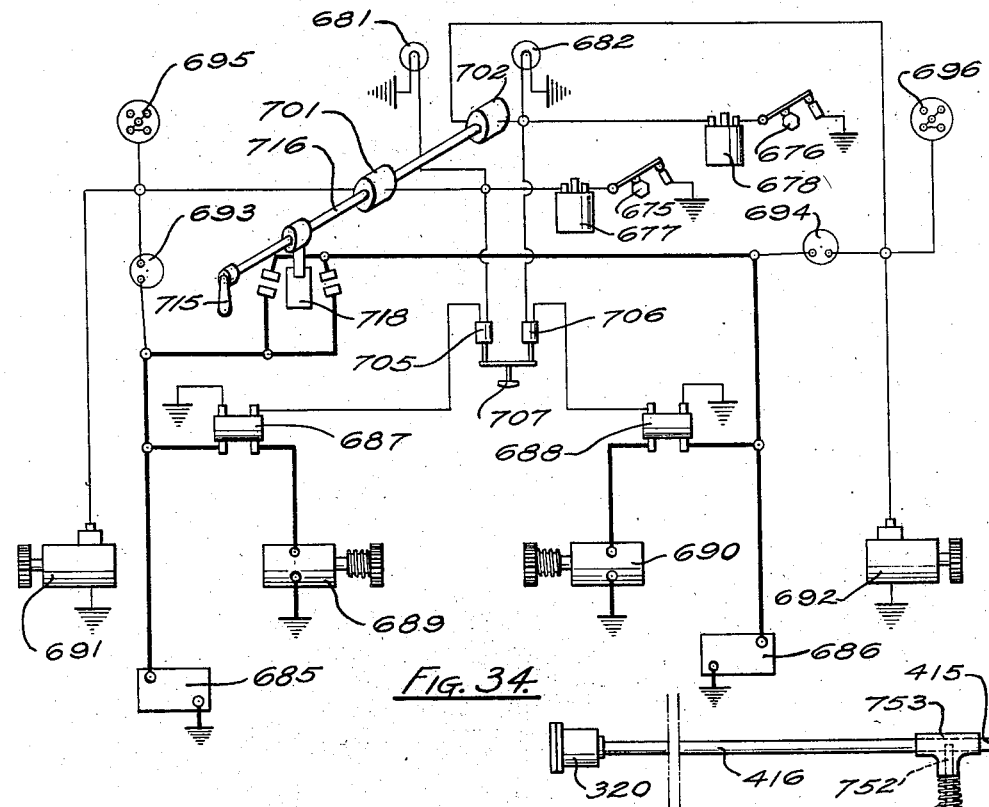
Fig. 34.
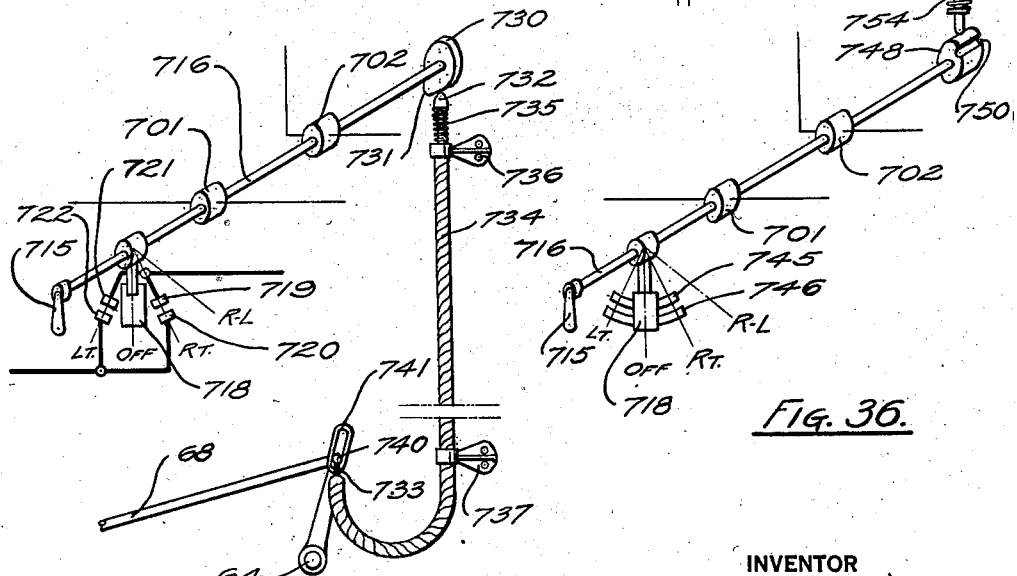
Fig. 35.
Fig. 36.
INVENTOR
Austin M. Wolf

Dec. 23, 1941.　　　A. M. WOLF　　　2,267,066
MOTOR VEHICLE
Original Filed Sept. 25, 1935　　12 Sheets-Sheet 12

INVENTOR

Patented Dec. 23, 1941

2,267,066

UNITED STATES PATENT OFFICE 2,267,066

MOTOR VEHICLE

Austin M. Wolf, Plainfield, N. J.

Original application September 25, 1935, Serial No. 41,958, now Patent No. 2,155,287, dated April 18, 1939. Divided and this application April 4, 1939, Serial No. 266,034

21 Claims. (Cl. 60—97)

This invention relates to motor vehicles, particularly buses and trucks. By means of the construction that I propose it is possible to utilize every square inch of projected floor area for the purpose of carrying passengers in the case of the bus or the load in the case of the truck. My invention here disclosed relates to power plants located at the extreme end of the vehicle, preferably the rear. The present application constitutes a division of my pending application for patent, Ser. No. 41,958, filed Sept. 25, 1935, now Patent No. 2,155,287, April 18, 1939.

An important object of the invention resides in the utilization of a plurality of small size engines which are low in first cost, as well as the parts thereof, and are cheaply maintained and serviced. The use of one large engine in present construction results in abnormally high fuel consumption when a light load is carried whereas with the use of a plurality of engines one alone can be used to propel the vehicle at light loads. Under these conditions the relatively wider throttle opening of the one engine with the greater load upon it, will bring about economical fuel and oil consumption.

The use of a plurality of power plants requires the proper synchronization of the individual clutches regardless of their relative wear. The clutch action also permits running on one engine and the proper actuation of the single clutch when operating on one engine is properly taken care of.

Small engines are not built to accommodate the large accessories that are provided on large engines particularly built for truck or bus service. I provide for the driving of the accessories which are not mounted on the engines themselves and where necessary provide an interlocking mechanism to insure their proper functioning.

A further object of the invention is to provide a method of mounting the entire power plant, including the engine or engines with the clutch or clutches and the transmission or transmissions so that the center of gravity of the assembly is directly over the supports under static conditions. Two mountings, preferably of the rubber type, are used for this purpose and a third point, also preferably of rubber, acts as a stabilizing support when the vehicle accelerates or decelerates at which time rotation of the power plant about the two supporting points spaced from the center of gravity is restricted to a desirable and cushioned minimum. A new type of engine mounting is proposed in which the engine is entirely supported by its bell-housing.

A further object of the invention is to provide for the interchangeability of engines and transmissions about a standard transfer case so that the power plant or power plants can be varied to meet the requirements of different operations or the size of the vehicle, depending on the extent of the vehicle power requirements and operating conditions. The utilization of a standard transmission case mounting and clutch shaft permits interchangeability of transmissions. Interchangeability of engines is provided by standardized bell-housing mountings.

A further object of the invention is to provide for the necessary remote controls where the power plant is located at the opposite end of the vehicle from the operator. This includes the throttle control from the accelerator pedal, the gear shifting control by mechanical means or fluid pressure and the necessary switches and electrical control for ignition and lights, incorporating therein the ability to cut out an engine where a plurality are used. An interconnecting mechanism is also provided on the ignition control to prevent the operation of a transmission other than from its neutral position. Furthermore, the ignition control is interlocked so that it is impossible to start up one engine unless the gear shift control is in neutral.

A further object of the invention is the provision of an independent electrical system for each engine but with provision that the two separate batteries that are used can be thrown into parallel when one engine is shut down.

Still further objects of the invention will appear as a description thereof proceeds, with reference to accompanying drawings in which:

Fig. 1 is a plan view showing the general disposition of the elements comprising the vehicle.

Fig. 2 is a side elevation thereof.

Fig. 2A is a horizontal section through a rear corner of the body of the vehicle showing a portion of the exhaust system.

Fig. 3 is an elevation of the power plant, and driving axle and the correlated parts.

Fig. 3A shows the support for the power plant at the trunnion end of the engine.

Figs. 4, 5 and 6 are detailed views showing a portion of the power plant mounting.

Fig. 7 shows an optional engine mounting construction.

Fig. 8 is a sectional view of the transfer case showing the general disposition of the gearing, accessory drives, engine and transmission mountings and a portion of the clutch operating mechanism. This view also illustrates my proposed ventilating system of the clutch compartment.

Figs. 14, 15, 16 and 17 show the gear shift and hand brake control systems.

Figs. 26, 27 and 28 show various possible combinations of engines and transmissions, all of which are attached by standardized mountings to the central transfer case.

Figs. 33, 34 and 35 are wiring diagrams for the power plant incorporated in my invention.

Fig. 36 shows an electrical control for the battery and a pressure control for the fluid clutch actuating mechanism, and, Figs. 37 and 38 show modified forms of power plants and their relationship in the vehicle.

Figure 9:
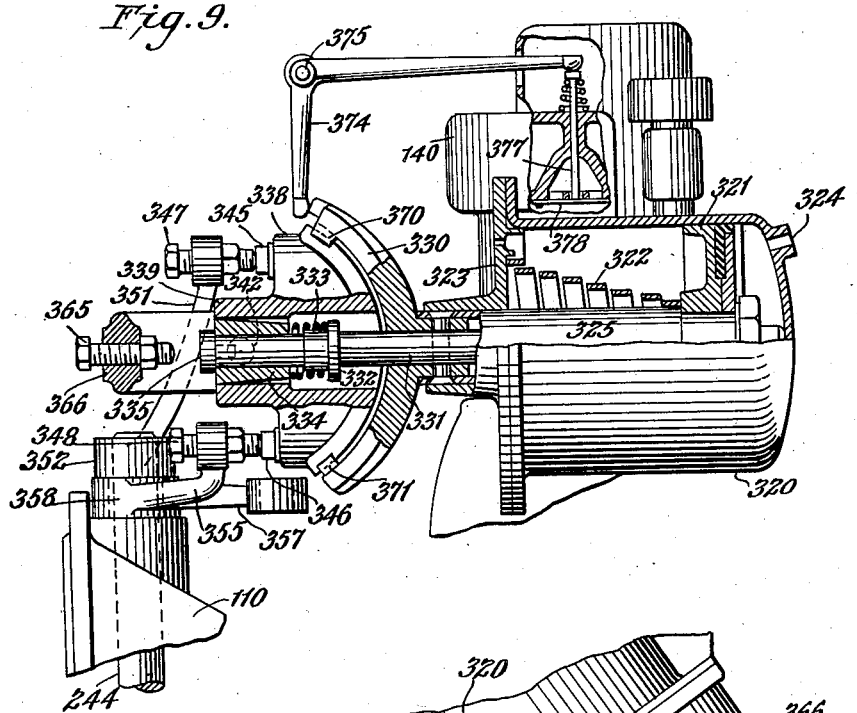
Figs. 9 and 10 show the clutch synchronizing mechanism.

Referring to Figs. 1 and 2 the vehicle illustrated is that of a bus in which the chassis frame and body frame are combined into the unitary structure. The main rail members 1 and 2 form a foundation for the body structure 3 by means of cross channels 5, 6, 7, 8, 9 and 10. There are other supporting members, not shown, to support the body, particularly the portion to the rear of cross member 10 in which a partial cantilever effect is obtained for the overhanging portion of the body which is furthermore braced in position by that portion to the rear of door 15 by means of the vertical posts 16, the roof structure 17 and the belt rail 18.

A front door 25 is located ahead of the front wheel house 26 and the door 15 is shown ahead of the rear wheel house 27.

The main rails 1 and 2 are tied together by the front cross member 30 and the cross members 31, 32, 33, 34 and 35. The front axle 40 is provided with the wheels 41 and 42. The driving axle 45 is provided with the dual wheel 46 and 47.

Above cross members 6, 7, 8 and 9 is located the flooring 50. At the forward end of same is located the driver's seat, not shown, behind the steering wheel 51. The steering gear mechanism within the housing 52 actuates the drag link 53 which is attached to the steering arm 54 on the front axle 40. The cross tie rod 55 connects the arms 56 and 57 to the front wheel spindles.

The forward end of flooring 50 is extended in the form of a ramp or toe-board 60 which acts as a support for the driver's feet and through which extend pedals 61 and 62, these being the brake and clutch pedals respectively. They are mounted on tube 63 and shaft 64 which are properly mounted on the frame structure. They actuate the control valves 65 and 66 through the intermediary rods 67 and 68. The control valves 65 and 66 are shown mounted on cross member 32 and their function will be described later.

The front axle 40 takes the forward body load through the front springs 71 and 72 which are held to the frame by brackets 73, 74, 75, 76, brackets 73 and 75 taking the eyes of the springs directly, whereas brackets 74 and 76 connect the spring to the frame through the customary shackle connection.

The driving axle 45 takes the rear portion of the body load by means of springs 81 and 82. Brackets 83 and 84 transfer the frame load to spring 81 and brackets 85 and 86 transfer the load to spring 82. Brackets 83 and 85 take the eye ends of the rear springs, whereas brackets 84 and 86 are of the slipper type and take the open ends of the rear springs. It will be noted that the main rails 1 and 2 have a kick-up over the driving axle and sweep downward toward the rear terminating at the brackets 91 and 92, the latter forming the extension of the main rails to act as a power plant support.

Rearwardly of door 15 the floor 50 continues in the ramp section 95 in order to provide riding clearance for the driving axle and continues to the rear of same in the horizontal floor portion 96. The rear seat cushion 98 and the seat back 99 are located over the box 100 which houses the engine or engines. This box has a vertical wall 101 and the top wall 102. These walls together with the wall 103 hermetically seal the engine compartment from the interior of the vehicle, to prevent any ingress of fumes.

The power plant consists of the prime movers 105 and 106 which are united to the transfer case 110. To the latter is secured the transmission 111. Power is conveyed therefrom to driving axle 45 by means of propeller shaft 115 with the slip type universal joint 116 adjacent the transmission and the universal joint 117 adjacent the driving axle. The hand brake disc 120 is located on joint 116.

In axial alignment with the main shaft of transmission 111 is the cooling fan 125 which directs a blast of air rearwardly through the core of the radiator 126. To the outer end of the crank shaft of each of the prime movers 105, 106 a fan 544 is operatively connected for the purpose of creating a continuous circulation of air longitudinally over and around the respective prime movers.

The gasoline tank 130 is located amidships and is provided with the filler 131 which is connected to the tank by means of a flexible tubing 132.

The braking system is of the conventional compressed air type with the actuating diaphragms 135 and 136 on front axle 40 and diaphragms 137 and 138 on the driving axle 45. The compressor 140 is driven by the power plant and air stored in the reservoirs 141. The piping between compressor 140 and the reservoirs 141 is not shown since it is well known in the art as well as the piping from the reservoirs 141 to the control valve 65 from whence piping, not shown, conveys air to the diaphragms 135, 136, 137 and 138.

Referring to Fig. 3 it will be noted that the frame extension 92 forms one-half of a circular bracket, the other half being the cap 145. Fig. 4 is a plan view of the rear end of rails 1 and 2 showing the extensions 91 and 92 with their caps 144 and 145 respectively. The bell-housings 150 and 151 of engines 105 and 106 are provided on each side with bosses 152, 153, and 154, 155 respectively. These are more clearly indicated in Fig. 26. Again referring to Figs. 1, 2, 3, 4 and 26 the bell-housings 150 and 151 are supported on brackets 158 and 159, the plan view of which is clearly shown in Fig. 4. The bosses 161, 162, 163 and 164 of these brackets take the bosses 152, 153, 154 and 155 of bell-housings 150 and 151 respectively. Brackets 158 and 159 are welded to the cross tube 160. The latter is supported by brackets 91 and 92 through the intermediary of rubber bushings 166.

Fig. 5 is a section on line 5—5 of Fig. 4 through bracket 92 and its cap 145. Between same and tube 160 are located the rubber walls 166. One such wall is shown in its natural or flat state in Fig. 6. As an example, should it be desired to press the wall to a final thickness of ½" when cap 145 is drawn up tightly to bracket 92, the thickness of the rubber could be made slightly oversize such as 9/16". The extent of the oversize will depend upon the durometer reading of the rubber. In assembling tube 160 in the brackets 91 and 92 a wall of rubber 166 is placed in bracket 92 being curved to conform to the general shape of the bracket. Tube 160 is then laid inside of the rubber, a second wall 166 is laid over tube 160 and curved around the latter by pressing cap 145 as close to bracket 92 as is permissible. The cap screws 170 in Fig. 3 are then drawn up, compressing the rubber walls 166. The length of the wall 166 in Fig. 6 is less than the mean radius of the wall in Fig. 5 in order to allow overflow of the rubber under compression. In the same manner the width of the rubber is slightly less than the width of either bracket 91 or 92 in an axial direction in relation to tube 160. In order to prevent the flow of rubber into the space between cap 145 and bracket 92 as the former is drawn up, the thin metallic shims 172 and 173 are inserted before compression process. They bridge the gap then existent and as the bracket parts are drawn together they prevent the flow of rubber radially outward.

The starting crank ends of engines 105 and 106 are provided with the customary trunnions 175 and 176 respectively. Brackets 178 and 179 encompass these trunnions and extend downwardly to form feet 180, as shown in Figs. 3A and 26. The feet rest upon the brackets 181 and 182 which are welded to tube 160 near its extremities. The distance from the center of the engine crankshaft to the face of brackets 181 and 182 is the same as the distance to the horizontal face of the lugs 152 and 153, 154 and 155 of the bell-housings 150 and 151 respectively where they rest upon the brackets 158 and 159. In this manner it is possible to place the brackets 158, 159, 181 and 182 on tube 160 and align their faces on a face-plate after which the welding operation ensues. This insures perfect alignment of the brackets and the proper aligned support of the engines through their outer supports 178 and 179 and their bell-housings 150 and 151.

It will be noted in Figs. 2 and 3 that the tube 160 is not located below the engine crankshaft center but to the right thereof. The center of tube 160 is so located that it is below the center of gravity of the complete power plant including engines 105 and 106, the clutches and mechanism within the transfer case 110, transmission 111 and all the power plant auxiliaries. In the case of the use of two engines, as shown in Fig. 1, since the engines are alike and their disposition symmetrical about the longitudinal center of the vehicle, their center of gravity would balance at the center on the crankshaft axis. This leaves the weight of the transmission 111 and universal joint 116 as an overhanging static load in respect to the crankshaft center. Tube 160 is therefore located under the center gravity of the entire unit and provides a two point mounting of the entire power plant by means of brackets 91 and 92. When accelerating or decelerating the vehicle there will be a natural tendency of the center of gravity to rotate about the center of tube 160 and the frictional grip of the rubber mountings in brackets 91 and 92 would be insufficient to limit it. A third point in the suspension of the power plant but which is unloaded under static conditions is the bracket 190 shown in Fig. 3. This is located at the universal joint end of the transmission 111 and replaces the ordinary end cap adjustment of the transmission countershaft which is fairly closely located to the longitudinal center of the vehicle and the center line of the transmission. Bracket 190 has an extension located between the frame cross member 35 and bracket 190. The former extends between bracket 190 and a washer under the head of bolt 193 which passes through blocks 191 and 192, bracket 190 and cross member 35. The desired resiliency of blocks 191 and 192 is obtained by the extent of their compression by bolt 193, which compression is made sufficient to snub incipient rotational tendencies of the power plant when a rocking action is instituted. The power plant suspension system, while of a three point type, is essentially a two point mounting except when extraneous forces bring the third point into effect. Since all points are of rubber, upon distortion between the frame rails 1 and 2, between which the cross member 35 is mounted, the rubber compensates for any misalignment as well as forming a noise insulating medium between the power plant and the frame base. Cross member 35 is bolted to main rails 1 and 2 so that it can be removed when it is desirable to take out the transmission 111 and leave the remainder of the power plant in position.

In Figs. 1 and 3 it will be noted that the frame cross member 10 extends slightly below transmission 111 in order to clear same when it is removed. In extending outwardly from the centre it is curved upwardly to contact with the underside of rails 1 and 2, thereby tying them together in addition to cross member 35. They extend outwardly to form a rear support for the base of the body structure 201 and 202. The front of the seat box 101 is extended down to the level of the rails 1 and 2 in order to give structural stability at this point. Angle irons 205 and 206 also brace the frame structure and are welded to the cross angle 207 in Fig. 3, which supports plate 97 which is a continuation of the flooring 96. Plate 97 is used in order to give clearance for the control head 210 of transmission 111.

Whereas, the engines 105 and 106 are supported by their trunnions and bell-housings, it is also possible to mount the engines entirely from their bell-housings 150 and 151 as shown in Fig. 7. It will be noted that the lugs 152 and 154 are secured to bracket 215 which in turn can be supported from the frame structure in any desirable manner.

The horizontal section through the transfer case is shown in Fig. 8. The bell-housing 150 of engine 105 appears in the lower portion of the view. Bell-housing 151 of engine 106, not shown, is symmetrically located at the other side of the longitudinal center line. Within the transfer case 110 is located the gearing whereby the power output of the two engines is delivered to the transmission 111 which bolts against the flange 220 of the transfer case 110 being held thereto by means of the studs shown. A conventional clutch 225 is mounted in the fly-wheel within bell-housing 150 and a similar clutch mechanism is incorporated in the opposite engine. A bevel gear 228 is integral with the clutch shaft 229. The corresponding gear 230 is also integral with the clutch shaft 231. Referring to the latter unit, it will be seen that it is mounted in a large double row ball-bearing 232 which is located between a shoulder and gear 230 and the lock nut 232'. This bearing is nested in the carrier 234 and prevented from end movement by a shoulder within same and the clutch throw-out sleeve member 235. The end surface of the sleeve extension is provided with a threaded section 236 which will return through holes 238 any oil that might seep through and by the bearing 232. Only one oil hole 238 is shown, whereas three are actually used and they empty into the counterbore 239, thence the oil returns to the sump 241 in Fig. 3.

Vertical clutch throw-out shafts 244 and 245 are provided to actuate each clutch independently. Keyed to these shafts are the yokes 246 and 247 which terminate in the bosses 248 and 249 respectively. It is of course understood that a similar arm extends above the shaft center as well as the arm shown below in Fig. 8. Within the bosses 248 and 249 are mounted a swiveling member 252, which is shown in the lower yoke in the view, the upper yoke receiving a like member. The swiveling member 252 has a square portion 253 which abuts a lug 254 on the throw-out cage 255. The lug 254 receives the necessary thrust to throw out the clutch when the yoke 246 is moved in a clockwise direction of rotation. The other clutch is thrown out in similar fashion when the yoke 247 is moved in a counterclockwise rotation. Within the cage 255 is located the antifriction throw-out bearing 256. The outer race of this bearing normally clears flange 260 of the clutch throw-out sleeve 261 when the clutch is in the engaged position. When it is desired to throw out the clutch, the outer race of bearing 256 contacts with the flange 260 and further movement of yoke 246 compresses the clutch spring 262. The operation of the clutch conforms to standard practice.

The throw-out sleeve member 235 is bolted to the bearing carrier 234 by a series of cap screws one of which has a projection 264 which prevents drifting or rotation of the cage 255 by means of lug 265 on the latter encompassing the projection 264.

The gear 228, its bearing, carrier, and the clutch sleeve form a unit which is assembled before inserting into the transfer case 110. Proper positioning of this unit is made possible by means of a laminated shim or a series of shims 267. It will be apparent that the outside diameter of the centralizing cylindrical portion of carrier 234 in case 110 is slightly larger than the maximum diameter of gear 228 in order to permit of assembly or disassembly of the entire unit.

Gears 228 and 230 mesh with the gear 270 which has a sleeve extension 271 which is in turn supported by the antifriction bearings 272 and 273. The latter are mounted within the carrier 274. The carrier is guided within a cylindrical section of case 110 and proper meshing of gear 270 with gears 228 and 230 is obtainable by means of shims 278. Within the sleeve portion 280 which projects toward the cone center of the gear and also, within the web portion of the gear, there are machined the internal splines 281 which fit the external splines 282 of the clutch shaft 285 of transmission 111. The shaft 285 is a standard clutch shaft of a transmission used for unit power plant mounting in which case the splines 282 would receive the splined clutch driven hub. In my invention the design of the various parts is such that a standard transmisison is used without resorting to any special parts or machined fits. For ordinary unit power plant use the transmission 111 is bolted to the clutch housing interposed between the transmission and the bell-housing of the engine. In this case the flange 220 of transfer case 110 is located and machined so as to take the transmission 111 and to position the splines 282 in order that the power transmitted to gear 270 can be transferred to the standard shaft 285 and thence into the transmission in the usual way. The end cap 286 of transmission 111 retains the constant mesh gear bearing 287 in place and also centers the transmission clutch shaft by piloting within the machined flange 288 of the transfer case. The bolt holes that are normally in the end wall of the regular clutch housing are located in flange 220 so that the retention and mounting of transmission 111 is the same as the normal incorporation of transmission 111 in the conventional unit power plant. It will be apparent, that with the standard clutch shaft 285 in various capacity transmissions and with the standard mounting flange 220, various transmissions can be bolted to the case 110. Various engines can also be bolted to the bell-housings 150 and 151 if they are kept to standard dimensions. The customary clutch housing flange in the ordinary unit power plant has its counterpart in the flange 290 of case 110.

The clutch shaft 285 is provided at the left extremity with the extension or pilot 294 which in the conventional unit power plant is piloted in the clutch throw-out bearing within the engine flywheel. The shaft 285 is thus centered by the pilot 294 and the bearing 287 in the transmission case. In order to maintain shaft 285 in its proper centralized position and not depend upon the fit of splines 181 and 182 for this purpose, since there is a clearance fit between them, the centering member 295 is pressed on the hub 280 and its internally ground hole fits on the outside diameter of splines 282. The seat for the centering member 295 is machined on hub 280 at the same time that the faces on sleeve 271 are machined for the bearings 272 and 273, thereby establishing concentricity of all these members as well as the gear itself. Whereas splines 281 and 282 have a sliding fit, it would be possible to make them a permanent fit, but this would prevent ready insertion of shaft 285 or its removal with the transmission 111 when the latter is taken out in servicing. Furthermore, more precise concentric relationship can be obtained by the method shown than by counting upon the proper splined fit.

A further advantage is taken of the splines 282 by designing the various parts so that they will project beyond the centralizing member 295 as shown. This is furthermore necessary since the hub 280 cannot extend any more to the left than is permissible in the machining of the teeth of the gear in order that the hub 280 remain within the base cone angle in order to provide clearance of the gear generating machinery. The projecting portions of splines 282 mate with the internal splined portion of hub 298 which is mounted on the fan drive shaft 299. The right end of the latter is machined out to accurately fit over the pilot 294. This fit assures running concentricity of the right end of shaft 299. The left end thereof is supported in the anti-friction bearing 300 which is housed within the transfer case cover 301. The lock nut 302 holds bearing 300 against a shoulder on shaft 299. The seal 303 within the end cap 304 prevents leakage of lubricant from the transfer case 110. Fan 125 is mounted on shaft 299 through the intermediary of the hub 306.

It will be apparent that in assembling the gearing, the gear 270, its bearings 272 and 273, the carrier 274, shims 278 and the centering member 295 are inserted through the opening provided by the cover 301 and set into place. Thereafter the gear units 228 and 230 are inserted from their respective ends of the transfer case.

In order to provide ample cooling within the clutch housing and thereby dissipate the accumulated heat obtained and stored in the members from the slipping of the clutch plates against the clutch friction surface, I provide an extending tube 308 which is fixed in the base 309 of the transfer case and thus communicates with the interior of the clutch compartment. Tube 308 extends to the left in close proximity to fan 125. The latter blows air to the left through the radiator core and thereby exerts a suction on tube 308. A screened opening 310 is provided in transfer case 110 or any other desirable part wherein the clutch and flywheel are housed permitting ingress of outside cool air. In order to provide a drive for an air compressor a sprocket 312 is piloted into an internal hole in the right end of sleeve 271. The pin 313, same being one of several used, transmits the necessary driving torque from sleeve 271 to sprocket 312. The locking nut 314 for bearing 273 encompasses pin 313 when the former is in its proper position. To remove sprocket 312, the locking nut 314 is screwed to the right whereby pin 313 is accessible for driving through to the interior of sleeve 271 when the transmission and its clutch shaft 285 have been withdrawn from the interior of sleeve 271. It will be seen that sprocket 312 becomes an additional element in the unit taking in the gear 270, its bearings, carrier and centering device.

The interior of the gear compartment of transfer case 110 is filled with oil so that the bevel gears dip therein, as indicated in Fig. 3. The passageway 316 in Fig. 3 permits the oil in the sump 241 to communicate with chamber 317 of the transfer case 110 providing lubricant for the air compressor driving mechanism, including sprockets and chain.

Figure 10:
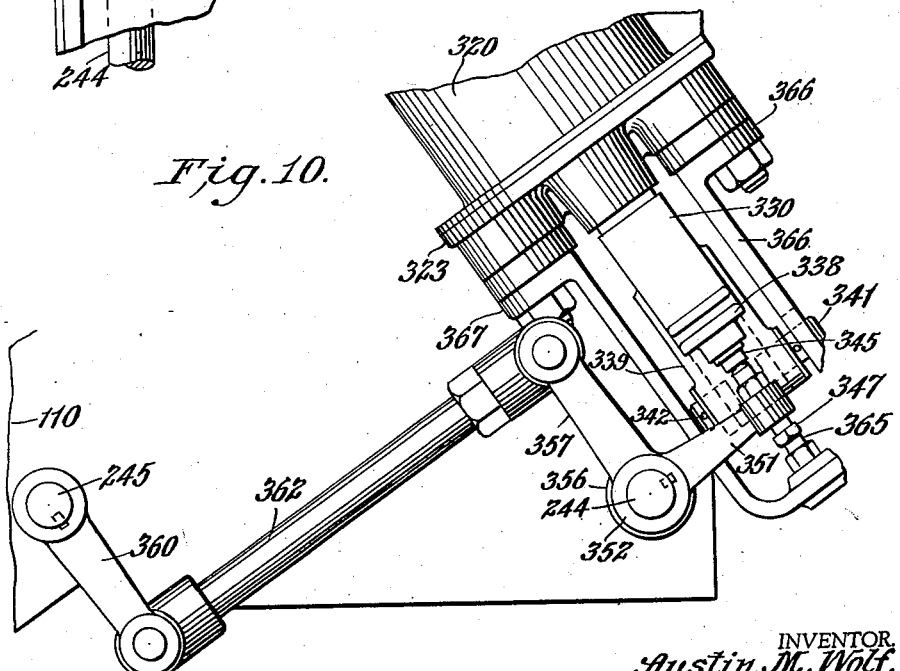

The use of multiple engines requires positive synchronization of the clutches when they engage. While it is theoretically possible to make a manual adjustment, same cannot last since any unequal wear in the clutch facings of one clutch as against the other, will immediately throw the clutches out of step. In my invention I have provided a means to accurately synchronize clutch engagement regardless of manual adjustment or the condition of the clutches themselves or the friction in their operating mechanism. The method pursued is to throw out the clutches at the same instant so that their following engagement must necessarily be simultaneous. While I show clutch actuation by means of fluid pressure, it is also evident that the same principle can be used by the use of mechanical means. In Fig. 1 the brake pedal 61 controls the valve 65. The pipe previously mentioned that conveys compressed air from the reservoir 141 to the brake valve 65 also conveys air to clutch control valve 66, which is actuated by pedal 62. Piping runs from this valve to the clutch actuating cylinder 320 which is mounted on top of transfer case 110 and adjacent compressor 140. Referring to Figs. 9 and 10 it will be noted that a piston 321 is located within the cylinder 320 and normally kept in the position shown by means of the spring 322 which bears against piston 321 at its right end and the end cap 323 on the left. When air is admitted from the valve 66 to the actuating cylinder 320 it enters through the opening 324 and moves piston 321 toward the left, compressing spring 322, while the piston rod 325 moves with it. To the hollow left end of piston rod 325 is secured the shoe 330 and the stem 331. The latter is provided with a shoulder 332 against which abuts the spring 333 which bears against the block 334. This block has a sliding fit on the left end of stem 331 and is prevented from moving beyond the position shown under spring pressure by abutting cap screw head 335. Relative movement of block 334 to the right in relation to stem 331 is permissible by compression of spring 333. The equalizer 338 has a rectangular hub extension 339 which is pivotally mounted on block 334 by means of pins 341 and 342. These pins are anchored in block 334 and terminate as shown in Fig. 10, so as to clear stem 331. The exterior of block 334 is rectangular in cross section but the top and bottom surfaces as shown in Fig. 9 are inclined, the purpose of which will be shortly described.

Equalizer 338 is provided with hardened buttons 345 and 346 which contact during clutch actuation with the rounded ends of set screws 347 and 348. These screws are adjustable and are provided with lock nuts in the customary manner. The former is mounted on the offset lever 351 having the hub 352 which is keyed to the clutch throw-out shaft 244. The screw 348 is mounted in the lever 355 having hub 356 and from which extends lever arm 357, thus forming the bell crank 355—357. The hub 356 is provided with the bushing 358 so that it may freely rotate about throw-out shaft 244. A lever 360, in Fig. 10 is keyed to the left throw-out shaft 245 and an adjustable rod 362 with the necessary yoke ends, one being fixed and the other adjustable, connects it with lever 357. It will therefore be seen that the clutch throwout shafts 244 and 245 will be actuated when piston 325 and the equalizer 338 move to the left in Fig. 9. The first movement of piston 325 results first in the take-up of any clearance between button 345 and screw 347 and between button 346 and screw 348. Further movement to the left, due to the pivotal relationship of equalizer 338 on block 334 results in the taking up of the clearance between the outer race of the clutch throw-out bearing 256 and the clutch sleeve 260 in Fig. 8. During this movement, equalizer 338 clears the inside curved surface of shoe 330 due to the pressure of spring 333. The latter is sufficiently strong to overcome any frictional resistance of pivots, shafts and levers up to the point of attempting to actuate the clutch sleeve 260. It will be seen that up to this point the action is completely equalized and that both throw-out bearings come in contact with the clutch throw-out sleeves and are ready to move them at the same instant due to the equalizing action of element 338. Further movement of piston rod 325 to the left causes compression of spring 333, whereby the equalizer 338 is caused to stand still while stem 331 and the equalizer shoe 330 advance to take up the clearance between the latter and equalizer 338, thus terminating in their frictional contact. The curved surface of equalizer 338 insures intimate contact between them. The reason that equalizer 338 is retarded in its movement is due to the fact that clutch spring 262 of each clutch causes sufficient resistance to make spring 333 compress. This is readily understood when it is mentioned that clutch spring 262 has an approximate pressure of 400 lbs. The compression of the clutch springs 262 is brought about after contact between shoe 330 and equalizer 338, at which time further movement of piston rod 325 to the left causes immediate and equal movement of the clutch sleeves 260. With the frictional contact between shoe 330 and equalizer 338, these two units now act as a solid mass and the equalizing action is cut out. This compels the two clutches to begin their release movement simultaneously after an equalizing adjustment has been made. Since the clutch sleeves 260 are moving in unison up to the full disengagement of the clutch, they will also move simultaneously and in exact synchronism when air is released from cylinder 320 and piston 321 and its piston rod 325 move to the right. The rigid relationship exists up to the time that the outer races of release bearings 256 are ready to depart from the faces of sleeves 260. Further movement of piston rod 325 to the right permits the shoe 330 to separate from equalizer 338 under the influence of spring 333. The entire assembly will thus assume the position shown in Fig. 9 where it is ready for a further release action. In order to prevent excessive movement of piston 321 so that throw-out bearing 256 be not unduly loaded, a stop screw 365 is located in the stirrup 366 surrounding the equalizer mechanism and attached to cylinder cap 323 by means of feet 366 and 367. In order to prevent rotational movement of the unit, since there is no restraining influence on piston 321, pin 341 of the equalizer hub 339 extends in a slot in stirrup 366. The rotational movement of the shoe 330 is prevented by means of fingers 370 and 371 which act as a side guide on the end of the curved rim of equalizer 338. In this way the entire mechanism is kept in proper alignment.

It is essential that with multiple engines the clutches engage simultaneously. In the above mentioned mechanism it will be noted that regardless of variation and friction of the operating mechanism, the moment of movement of the clutch sleeves 260 is absolutely synchronized. Since the clutches disengage at the same instant and at which time the entire mechanism is locked solid, the clutches must engage simultaneously during the reverse movement of the mechanism. It will be noted that before such disengagement the equalizing mechanism takes "feel" of the two distinct clutch throwout mechanisms and at the proper time the mechanism is locked solid. In this way every clutch actuation amounts to an individual and distinct adjustment prior to the operation. This is entirely apart from a predetermined mechanism set-up which cannot sense any unusual variations following the intial adjustment. The only possible variation in clutch synchronization taking in both disengagement and engagement would be with a variation in the pressure in the individual clutch springs 262. These springs are manufactured to very close limits and if necessary can be selected so that the variation between them is nil, thus assuring positive synchronization of clutch action.

It was noted in reference to Figs. 3 and 8 that the air compressor was driven from sprocket 312 attached to the driven gear sleeve 271. Since this drive occurs between the clutch or clutches and the transmission mechanism, operation of the compressor during the moment of disengaging the clutch or clutches would cause retardation of this immediate mechanism due to the resistance of the compressor. Such slowing up would cause improper gear shifting and in order to overcome such an occurrence a bell crank 374 is pivoted on fulcrum 375, contacting at one end with the shoe 330 and at the opposite end with the stem 377 of compressor 140. The lower end of the latter just clears the inlet valve 378, same being shown as of the spring or disc type. In order to prevent the compressor 140 from operating during clutch actuation, movement of piston 321 to the left will cause depression of stem 377 and thus hold open valve 378 preventing the compressor from functioning but merely idling over under atmospheric pressure with the inertia or flywheel effect of its parts and drive as well as that of fan 125 and its drive. Stem 377 can be made to function with the usual compressor unloader mechanism. If so desired, a set screw can be located at the end of depending arm of bell crank 374 to contact with shoe 330. It is to be noted that the latter moves in conjunction with piston 321 for each clutch actuation. While I have shown a fluid operating mechanism to actuate the rod 325, it will be readily understood that same can be mechanically actuated from the clutch pedal 62 in Fig. 1, if so desired.

The last described feature of the present disclosure constitutes a part of the claimed subject matter of my issued patent, above identified.

Figure 11:
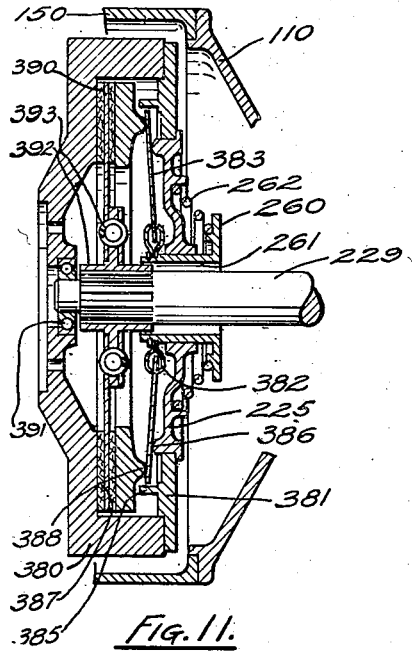
Figs. 11 and 12 show the method of operating the clutch pressure plate and the geometrical relationship between a plurality of same.

The clutch mechanism housed in each flywheel is of typical construction, but in order to fully explain the ability of the clutch mechanism to continue throughout the life of the clutch facings regardless of their relative wear, a description of the clutch will be given, reference being had to Fig. 11. The flywheel 380 takes the outer clutch rim 381 which in turn supports the inner member 225. The inner end of the clutch sleeve 261 is provided with the guide 382 and which encompasses the clutch throw-out elevers 383. These consist of a multiplicity of radial plates, forming in their entirety a complete circle. These plates are restrained from outward movement due to centrifugal force by the flange 385 and housing member 381. The fulcrum for the levers 383 is provided by the angular ridge 386 on the inner member 225. The clutch driving plate 387 contacts with levers 383 through the circular ridge 388. It will be seen that when sleeve 261 is moved to the left against the pressure of spring 262 by means of the throw-out bearing contacting with face 260, levers 383 will swing about ridge 386 as their fulcrum point in a counterclockwise direction, thereby relieving driving plate 387 of pressure. The clutch disc 390 is now free between the friction faces of flywheel 380 of the driving plate 387. Clutch shaft 229 is piloted in the flywheel by bearing 391 and takes the clutch hub 392 from its splined portion. Drive is transmitted thereto through the intermediary of the clutch damper mechanism 393. This entire mechanism is naturally duplicated in the other clutch.

Figure 13:
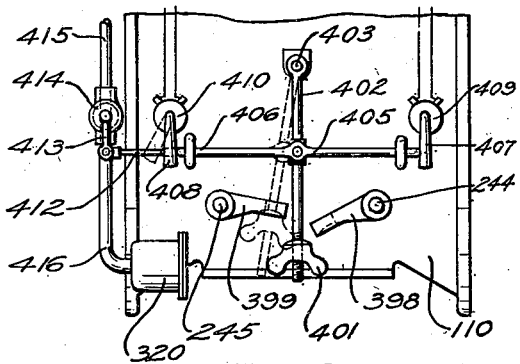
Fig. 13 shows the mechanism whereby one engine can be cut-out by latching out one of the clutches.
Figure 12:
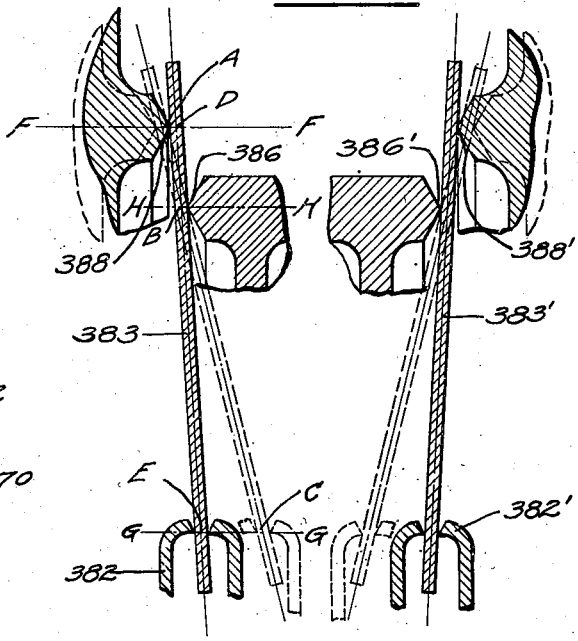

A diagrammatic representation of the two clutches is shown in Fig. 12 in which the guide 382, lever 383, the fulcrum 386 and the pressure plate ridge 388 have their counterpart in the right hand clutch by the corresponding parts 382' and 383', 386' and 388'. It is possible in running on one engine alone that a greater amount of wear will occur on the friction lining of the clutch being used than when utilizing both engines. Such unequal wear will have no effect in the system that I propose. Let us assume that clutch plate 383' is moved to the dotted position shown due to wear on the clutch facings. In order to compare the relative angular positions of the clutch levers, let us transpose its position to the left side of Fig. 12, thus making the line ABC, B being the fulcrum point. We will assume that the left clutch is not worn to the same extent, lever 383 forming the line DBE. With the construction of the ridges 386 and 388, together with the guide 382, it will be seen that points A and D lie on line FF and points E and C lie on the parallel line GG. The third parallel line HH is drawn through point B. It is a geometrical fact that if two lines such as ABC and DBE intercept at B on line HH and pass through two other parallel lines, FF and GG, that for a given movement of point E there will result a certain movement of point D. For an equal movement of point C, in spite of its difference in angularity between ABC and DBE, the movement of point A will be equal to that of point D. Furthermore, regardless of the inclination of the lever 383, the ratio of its lengths between the parallel lines FF and HH and between HH and GG will always be constant. In this way, regardless of clutch wear on either side, the clutches will always act in synchronism due to the constant inherent leverage of the clutch levers 383 and also that for the same movement of clutch sleeves 261 imparted by the equalizer 338 in Fig. 9, the release or actuation of the clutch plates 387 will always be the same. With this fixed geometrical relationship there can be no alteration in the synchronous movements of both clutches. During light loads, such as in the middle of the day, as compared to rush hours in the morning and at night, the desirability of using one engine results in considerable fuel and oil saving, due to the greater loading of the one engine used as compared to the partial throttle opening of one large engine which is then at its most disadvantageous fuel consumption period on the consumption curve. I propose to latch out either one of the two engines and a means of so doing is accomplished in Fig. 13. It will be noted that the clutch throw-out shafts 244 and 245 extend through the bottom of the transfer case 110 as indicated in Fig. 3 and shown diagrammatically in Fig. 13. To the shafts are affixed the levers 398 and 399 having a forked end and a spherical depression into which can be fitted a spherical base of wing nut 401 on the rod 402 which is pivoted below the transfer case on fulcrum 403. The left clutch is diagrammatically shown latched out. This operation is performed by throwing out the clutches which causes clockwise rotation on lever 398 and counterclockwise rotation on lever 399. With the clutches so set, the rod 402 is swung to the left and wing nut 401 run-up on the rod until its spherical end seats in the spherical cavity of lever 399. The left clutch is then held in the disengaged position by yoke 247 of Fig. 8 and gear 230 will rotate idly as will the clutch disc in driving connection with the end thereof. The clutch plate having been released and being held, there is no frictional engagement of the clutch. Similar operation can be made upon the right clutch by means of holding lever 398 in a disengaged position. This feature also is claimed in my issued Patent 2,155,287.

When one of the clutches is latched out, the equalizing mechanism will be affected unless special provisions are taken care of so that the actuation of the working clutch will be normal. This can be accomplished by locking equalizer 338 in Fig. 9 when one of the clutches is latched out. In order to avoid the use of extra parts, the construction shown has been evolved to automatically take care of such a situation. It will be noted that block 334 has a tapered top and bottom surface. The hole in the hub 339 of equalizer 338 is rectangular in shape and its height is slightly greater than the greatest vertical thickness of block 334 so that the rocking of equalizer 338 about pins 341 and 342 be unimpeded. For the purpose of explanation, let it be considered that lever 351 has been moved to the left in Fig. 9 through the locking out of the clutch controlled by clutch shaft 244. Movement of piston 321 to the left for actuation of the sole working clutch would cause counterclockwise rotation of equalizer 338 as it advances with stem 331. This is due to contact of button 346 against screw 348. This movement is, however, only slight, since the bottom surface of the rectangular hole in hub 399 will contact with the bottom tapered surface of block 334. At this point the equalizer 338 can rock no further and to all intent is a solid unit in the entire assembly. Lever 355 and clutch shaft 245 are now actuated upon further movement of piston 321. The operation in the case of the latching out of the other engine would follow in similar fashion as explained above excepting that equalizer 338 would be given a slight rotation in a clockwise direction when button 345 first contacts with screw 347, screw 348 being out of operating position at this time.

The frictional contact established between equalizer 338 and shoe 330 will depend upon the area and the materials of the contacting surfaces. Naturally, they are made sufficient to prevent rotation of equalizer 338 when the clutches are being actuated, in disengagement or engagement. The forces of the clutch springs 262 and the leverage involved from either clutch throw-out shaft (both being preferably alike) to the pivotal axis of pins 341 and 342 and including the radius of the frictional contacting surfaces on 330 and 338, are all taken into account so that the frictional grip of the relating members will not be impaired. It is desirable to use relatively soft metallic surfaces such as bronze for shoe 330 and an aluminum alloy for equalizer 338. It will be readily seen that other variations are possible in the utilization of soft metal such as lead with another metal. It is even possible to line one of the curved surfaces with a material similar to brake lining or one possessing resiliency such as a rubber compound. Furthermore, it is possible to change the physical surface of shoe 330 and equalizer 338 by means of rough machining or by the machining of small serrations in each surface which will interlock with each other upon contact.

The rod 402 has linked to it the rods 405 and 406 which are attached to the arms 407 and 408 of switches 409 and 410 respectively. These switches are of the rotary type and the wires running to their binding posts put them in series with the primary circuit of the ignition system. When the rod 402 is in the middle position at which time both clutches are engaged and both engines running, the primary circuit of the ignition system for each engine is completed. When rod 402 has been swung to the left as indicated diagrammatically, switch 410 breaks the contact in the primary circuit for the engine on that side of the vehicle, while switch 409 maintains the circuit intact for the right engine. Conversely, if rod 402 is swung to the right in the position for latching out clutch shaft 244, switch 409 breaks the contact in the primary circuit for the right engine and maintains it in switch 410 for the left engine. Link 412 extends to the left from rod 406 and is secured to the lever 413 of the air valve 414. In the neutral position shown, air entering pipe 415 passes through the barrel of valve 414 without restriction and enters pipe 416 to be conveyed to the clutch control cylinder 320. When rod 402 is swung either to the right or left to cut out an engine, the barrel of valve 414 is rotated axially and therefore its through passage restricts the flow through the inlet and outlet ports of valve 414 cutting down the effective area of the valve capacity. This throttling effect will then reduce the pressure in cylinder 320 for clutch actuation when only one engine is running. The clutch spring pressure in the neighborhood of 400 lbs., has only to be overcome when one engine is used, as compared to 800 lbs. when both engines are in action.

Figs. 14 and 15 represent the control mechanism for gear shifting and applying the service brake. The gear shifting lever 420 is pivoted to the extension 421 on tube 422, which permits pivoting thereabout in a substantially vertical plane. Lever 420 can also be axially rotated as shrown in Fig. 16 so as to assume one of three positions. The lower end of lever 420 is provided with a ball end 424 and which is confined between the plates 425 and 426. These plates are united on each end by blocks 427 and 428 which reestrict a permissible degree of rotation of lever 420 about the axis of tube 422. When the lever is in either of the three positions shown in Fig. 16, a fore and aft movement of the lever 420 will cause a forward or backward movement of tube 422. The latter slides between the bushed guides 430 on the forward end and 431 on the rear end. An intermediate bushing 432 is mounted on a frame cross member with a soft rubber bushing between the bearing bushing 432 and the bracket 434. Located forward of the driving axle, and in order to run the control up and over same, a selector box 435 is provided as shown in Figs. 14 and 17. On the rear end of tube 422 is located and attached thereto a vertical lever 438. Transverse rocking of gear shift lever 420 causes a transverse rocking of lever 438 and this movement is indicated in Fig. 17. This rocking motion causes the upper end of lever 438 to engage with one of the three shifting bars 441, 442 or 443 which are slidably mounted and housed within a bracket 435. These bars are connected with the shifter rods 444, 445 and 446 through the intermediary of rods 448, and 449 and 450. In this way the fore and aft motion of tube 422 is imparted to either one of the bars 441, 442 or 443 after rotational movement of tube 422 has picked up the desired one. The movement of the transmission shifter bars is thus accomplished in a control mechanism extending up over the driving axle at a point sufficiently above to clear it in its topmost position. The control of the service brake disc 120, with inverted brake shoe support, Figs. 3 and 14, is accomplished by pull cables 454 and 455 which are guided within the conduits 456 and 457 to hold them clear of the driving axle. At their forward ends the cables are connected to the equalizer bar 459. A rod 460 connects the equalizer 459 with the customary hand lever 461. The ratchet retaining mechanism for same is not shown.

Referring to Figs. 15 and 16, it will be noted that the lever 420 is provided with the customary reverse latch 423 which must be raised in order to enter the reverse slot of the conventional control. Latch 423 is connected by a rod, not shown, to lock 429 which restricts the oscillation of lever 420 in the neutral position to the selection of either of the two forward speed control bars 442 and 443, assuming that a four speed and one reverse transmission is used. In order to pick up the reverse bar 441, lever 420 must be moved in a counterclockwise direction as seen in Fig. 16. However, the lock 429 prevents this movement unless it is raised in order to clear the upwardly extending portions of plates 425 and 426. By raising latch 423, the lock 429 is made to clear the obstacle thus presented and in the final position, lever 438 is able to pick up selector bar 441.

It will be noted that due to transmission 111 being turned around from its conventional position in a vehicle with a forwardly located engine and assuming that the selector rods 444, 445 and 446 are retained in their same relative positions, the movement of these selector rods must be in the opposite direction to the conventional location. This opposite movement is compensated for due to the fact that lever 420 has its fulcrum in shifting at ball end 424 which is below the tube 422, whereby the latter is imparted an opposite direction of travel from the customary selector bars which are below the fulcrum of the shift lever in the conventional control mast. Furthermore, with the turning around of transmission 111 from conventional practice, the selector rods 444 and 446 are on the opposite sides. This again is compensated for in my construction due to the fact that lever 438 at the end of tube 422 moves in unison with the portion of lever 420 above the extension 421. In this way lever 438 selects the proper selector bar as the action is again reversed from the conventional, since in the latter case the selector bars are picked up below the shift lever fulcrum in the control mast. Ball end 424 has a slight up and down movement since the pivot of lever 420 is restrained to move on the axis of tube 422.

Figure 18:
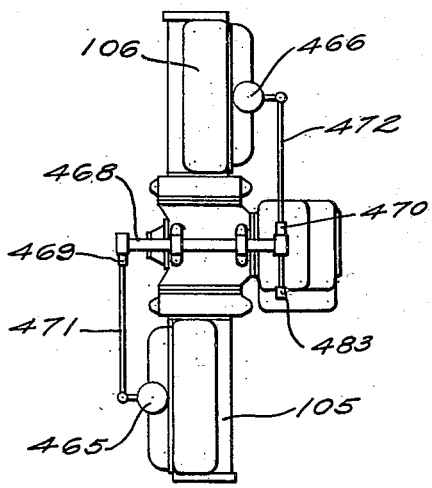
Figs. 18, 19 and 20 show the accelerator pedal control of the engine throttles.
Figure 19:
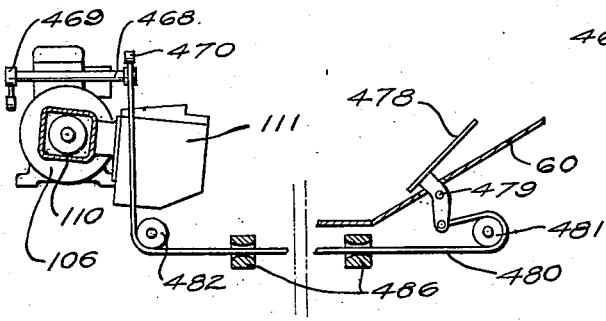
Figure 20:
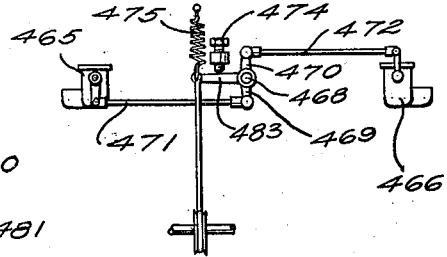

The accelerator control mechanism is shown in Figs. 18, 19 and 20; Fig. 18 being a plan view, Fig. 19 being an elevation and Fig. 20 an end view. The engines 105 and 106 are provided with carburetors 465 and 466. A rugged cross shaft 468 is provided with levers 469 and 470 and actuate the rods 471 and 472 running to the throttles of carburetors 465 and 466 respectively. Shaft 468 is held against an adjustable stop by a tension spring 475. In this position the carburetor throttles are shut. The accelerator pedal 478 above floor board 60 has a fulcrum 479 and depression of pedal 478 causes the lower lever arm of the pedal to exert a pull on cable 480. The latter passes over pulleys 481 and 482 and is secured to lever 483 on the cross shaft 468. Lever 483 also receives tension spring 475 and abuts the stop screw 474 in the "shut" position. It will be seen that accelerator control consists chiefly of the utilization of a cable in tension which is provided in its length with the bell-mouthed bushing 486 to prevent whipping. Rods 471 and 472 have adjustable ends for close individual adjustment.

Figure 21:
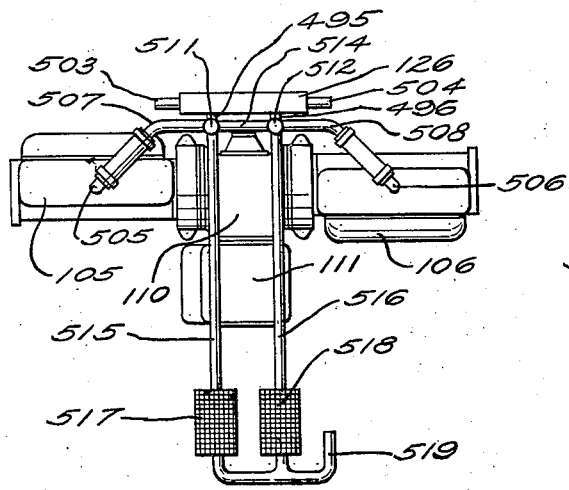
Figs. 21, 22, 23, 24 and 25 show the engine cooling system and the provision for supplying hot water to heat the interior of the vehicle.
Figure 22:
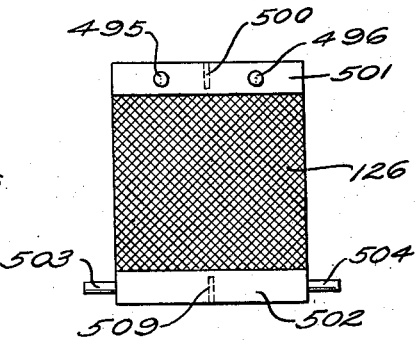
Figure 23:
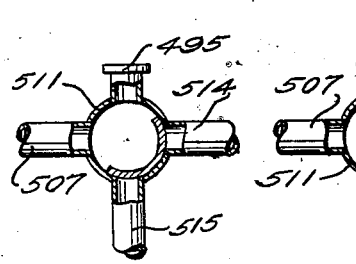
Figure 24:
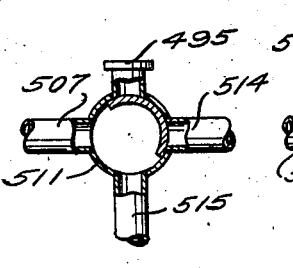
Figure 25:
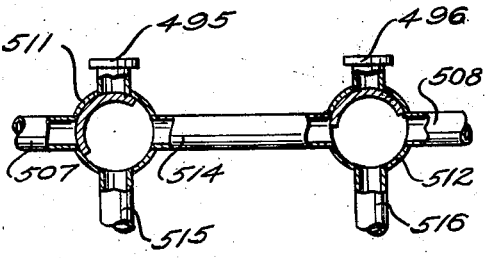

The radiator 126 in Figs. 21 and 22 is provided with the inlets 495 and 496 in the upper tank thereof. A dividing wall 500 extends down to within a small distance of the radiator core. In this way the bulk of the water circulation is kept independent for each of engines 105 and 106, but still permits a certain amount of thermal and volumetric compensation between the two. In the case of the one engine running alone, the interconnection in the top tank 501 and the common bottom tank 502 keeps the cooling system of the dead engine still warm so that in cold weather the inactive engine can be impressed quickly into service without excessive choking or loss of power. It will be noted that the water header 505 of engine 105 and the header 506 of engine 106 connect with the pipes 507 and 508 which are interconnected with the inlets 495 and 496, through the valves 511 and 512. Normally the circulation is from each engine into its respective half of the radiator top tank. Fig. 23 shows the relationship of valve 511 diagrammatically under these conditions. Should it be desired to send water into the water heating system in the body of the vehicle represented by lines 515 and 516, the valve 511 is rotated axially to the position shown diagrammatically in Fig. 24. Valve 512 is also turned to the corresponding position. Assuming that engine 105 is "dead" and it is desired to send hot circulating water through both lines 515 and 516, the valve 511 would be rotated to the position shown diagrammatically in Fig. 25 and valve 512 would be rotated to the position shown. In this way, heating of the interior of the vehicle can be obtained with either or both engines operating. It will be noted in Fig. 21 that the heaters 517 and 518 representing the heating elements within the body and the common return pipe 519 delivers the water back to the suction side of the pump, as in the conventional construction. The pump and its connection for each engine to the individual outlets 503 and 504 from bottom radiator tank 502 follows conventional practice and therefore is not shown. Each engine, therefore, has its individual water outlet from radiator 126. In bottom tank 502 a dividing wall 509 can be provided if desired to accomplish a still further separation of the volume of water to each engine. The wall 509 extends up to within a small distance of the radiator core, functioning at this point in a similar manner to the wall 500 in the top tank 501.

A connecting pipe 514 between valves 511 and 512, permitting cross flow when required, has been indicated. It will be noted that the walls of the rotating members of valves 511 and 512 are of such a length as to cause the proper closure of the necessary valve ports and when valve 512 is in the position shown in Fig. 25, part of the port to pipe 514 is covered thus insuring an equal distribution of water in the lines 515 and 516.

The possibility of using various engines, differing as to size, type, capacity or with other variable characteristics, is indicated in Figs. 26, 27 and 28. As previously described, the engine 105 and its bell-housing 150 attaches to the transfer case 110 and on the opposite side is located engine 106 and its bell-housing 151 secured to transfer case 110 in like manner. Fig. 27 shows relatively larger engines 525 and 526 attached to transfer case 110 through the intermediary of their bell-housings 150 and 151. The relatively larger output is taken care of by the larger transmission 528. There will naturally be a variation in the bevel gearing within the transfer case 110, the same being designed to take care of the torque capacities involved. It will readily be seen upon referring to Fig. 8 that the case 110 can accommodate smaller or larger bevel gears by interchanging them, their bearings and bearing carriers so as to conform to the dimensional interior and necessary mountings in case 110, while still retaining the clutch shafts 229 standard insofar as the clutch mounting is concerned.

Fig. 28 shows the possibility of using a different size engine 530 secured to transfer case 110 by means of bell-housing 150 and the regular end mounting 180 to the tubular support below the engine and in this case the transmission 534 is considerably lighter in view of the lighter work it is subjected to. An end cap 536 closes the aperture at the side of case 110 in view of the absence of bell-housing at that side. Naturally in this arrangement the bevel gear 230 and its auxiliary elements are omitted.

It will be noted from Figs. 2, 26, 27 and 28 that a variety of engine and transmission combinations can be accommodated within the seat box 101—102. Furthermore, due to the fact that relatively small engines are used, the space below the rear cross seat 98 is sufficient to accommodate the prime movers whereby each projected square inch of floor area becomes useable. Waste space between the rear seat back and the end of the vehicle, as shown in my Patent No. 2,132,450 issued October 11, 1938, is entirely eliminated.

With the rear disposition of the power plant, I propose to use an overhead exhaust system. It will be seen in Fig. 26 that the exhaust manifold is provided on engines 105 and 106 with the flanges 531 and 532 respectively. These flanges face upward in place of the customary downward inclination. The exhaust pipe 535 conveys the products of combustion to the muffler 536, same being of oval shape and being nested within the inner panel 537 and the outer panel 538 of the rear corner portion of the body structure. The space between these panels and the vertical posts 16 and 540 is filled with sound and heat insulating material which thermally and acoustically isolates muffler 536, exhaust pipe 535 and tail pipe 542. It will be noted that tail pipe 542 extends through the roof and upwardly a sufficient distance so that the surrounding air will envelope the exhaust products and prevent their attempting to fill the partial vacuum existing at the back of the body during motion. In order to provide adequate ventilation beneath the seat box 101—102, it is desirable to remove the stagnant air that might accumulate therein. It is not sufficient to depend entirely upon the fan 125 for this purpose. The fan draft is indicated by arrows K forcing air through the core of radiator 126, an opening in the body back panel permitting egress of same.

The engines 105 and 106 are provided with the fans 544 and 545 respectively. Stagnant air in the area over the cylinder blocks is removed by the air currents induced by fans 544 and 545 in creating the flow indicated by arrows L and M through circular openings in the body side panel below the level of the rear seat 98. In Fig. 27 the fans 546 and 547 are shown inducing the air current from the exterior of the body to the interior of the engine compartment as designated by arrows N and O. These two streams converge at the center and flow back and outwardly in the direction of arrows K. By such ventilation, excessive heating of the rear seat portion and the interior of the body is avoided.

The ventilating and cooling system last described likewise forms part of the subject matter claimed in my issued Patent 2,155,287.

Figure 29:
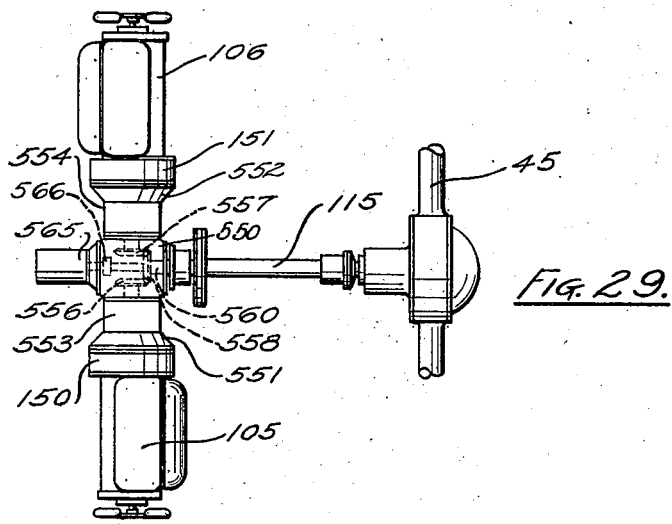
Fig. 29 shows a modified form of power plant in which each engine is provided with a transmission ahead of the transfer case.

The engines 105 and 106 in Fig. 29 have the customary bell-housings 150 and 151. Interposed between them and the transfer case 550 are located the clutch housings 551 and 552 together with transmissions 553 and 554. The transfer case 550 contains the bevel gears 556, 557 and 558, the latter conveying power to shaft 560. The propeller shaft 115 conveys the power to the driving axle 45. The shaft 560 is extended to drive the generator 565 and is also provided with the sprocket 566 to drive an air compressor and/or other accessories.

Figure 30:
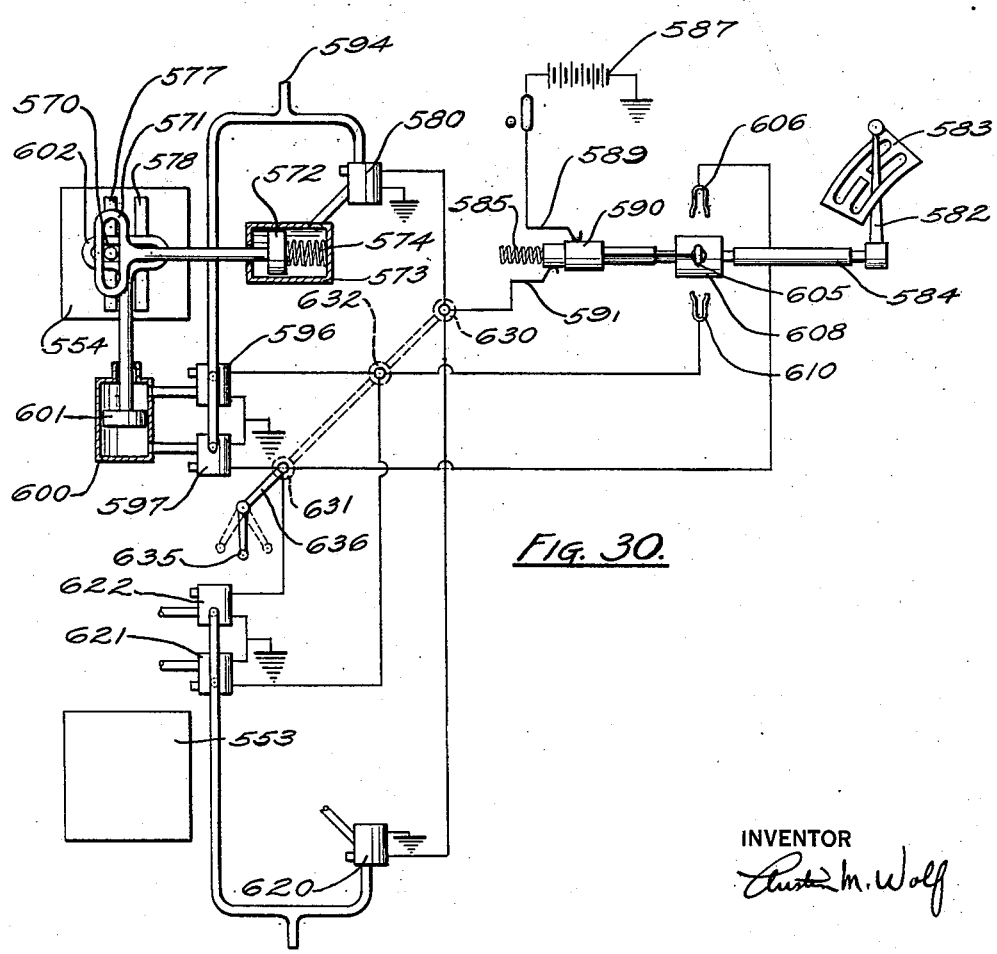
Figs. 30, 31 and 32 show an ignition and gear shifting control for same.

To provide a control for two transmissions in the case of Fig. 29 as contrasted to the previous descriptions covering one transmission, I propose to use the electrically controlled fluid pressure system shown in Fig. 30. It will be noted that a selector pin 570 can be moved to the right or left by means of yoke 571 which is attached to piston 572 in cylinder 573. Spring 574 holds piston 572 in the left position shown, whereby pin 571 is in line with the second and third speed shifting bar 577 of a three speed and reverse transmission 554. Vacuum enters cylinder 573 by means of the solenoid valve 580 and piston 572 is moved to the right, compressing spring 574 and causing pin 571 to pick up the reverse and first speed shifting bar 578. The control lever 582 can be moved in the H. quadrant 583. It is mounted on shaft 584 which it can rotate axially as well as shift it longitudinally. A spring 585 normally maintains shaft 584 to the right, thus normally holding lever 582 in the right, or in the high and second speed slot of quadrant 583. In this position, piston 572 and pin 570 are in the position shown. A current source 587 is connected with contact finger 589 which touches thimble 590 on shaft 584. If lever 582 is pushed to the left across the neutral slot, contact will be made by sleeve 590 with finger 591 thus energizing solenoid valve 580. The pipe 594 is connected with a vacuum source, such as the intake manifold, providing valve 580 with negative pressure. The vacuum line is also connected with the solenoid valves 596 and 597, each controlling an end of cylinder 600 within which is located piston 601 connected to yoke 602. Piston 601 in this way actuates pin 570 so as to cause movement of either rod 577 or 578 subsequent to their selection by piston 572. Vacuum admitted by solenoid valve 596 to cylinder 600 will cause pin 570 to move upward in the drawing; whereas valve 597 controls the downward movement. The electrical selection of either valve is obtained by the rocking of lever 582 in either quadrant slot. Rocking the lever away from the plane of the paper causes bar 605 to move upward and make contact with finger 606 which is electrically connected with sleeve 590. It is mounted on and insulated from the barrel 608 which is held for endwise movement but rotates with shaft 584 by means of a splined fit between these members. When lever 582 is rocked downward out of the plane of the paper, bar 605 contacts with finger 610 and current is sent to valve 596, causing movement of pin 570 upward in the drawing. Parallel electrical connections are made to the corresponding valves 620, 621 and 622 for the control of transmission 553. At the junction points 630, 631 and 632 of the circuit shown, a suitable switch can be interposed, actuated by lever 635 and shaft 636 whereby it is possible to convey the electrical energies imparted to contact 591, fingers 606 and 610 to the control apparatus of either transmission 553 or 554, or to both.

Figures 31, 32:
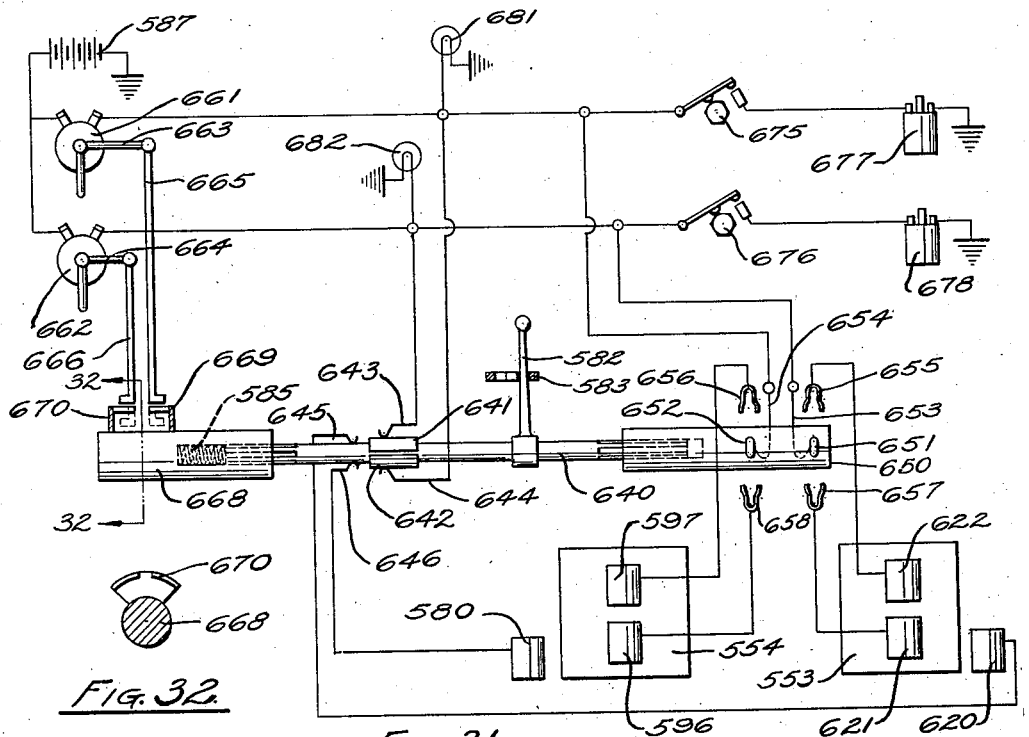

A separate control system for each of transmissions 553 and 554, together with an interlocking ignition switch control is shown in Fig. 31. The solenoid valves are the same as before and it will be noted that the control lever 582 actuates shaft 640 and imparts, as before, a combined rotary and longitudinal movement. On shaft 640 and insulated therefrom are the half-sleeves 641 and 642 upon which bear the fingers 643 and 644. Movement of shaft 640 to the left brings the half sleeves in contact with fingers 645 and 646. The barrel 650 is held from endwise movement but rotates with shaft 640 in view of the splined fit between them. The insulated bars 651 and 652 have current conveyed to them by means of flexible conduits 653 and 654. It is also understood that slip rings could be used in their stead. The bars 651 and 652 contact with either finger 655 and 656 respectively or with fingers 657 and 658 depending upon the direction of rotation of shaft 640. The control of the solenoids to affect gear shifting is the same as previously explained in Fig. 30. The ignition switches 661 and 662 are connected with a source of energy 587 and when either or both switches are on, current flows to the apparatus just described, thus making it necessary for the ignition switch to be "on" in order to affect gear shifting of the particular transmissions desired. An arm 663 or 664 is moved by the ignition switch 661 or 662, the lower ends of which are offset as shown. The barrel 668 is held from endwise movement but rotates with shaft 640 due to the splined fit between them. Spring 585 within barrel 668 holds shaft 640 normally to the right as shown. The barrel 669 is provided with the segment members 669 and 670, each of which consists of a circular lip as shown in Fig. 32 and with an interruption at the center of each lip through which the offset ends of rods 665 and 666 can pass to assume the position shown by the dotted lines. In order to turn on the ignition switch of either or both engines, it is necessary that the shift control lever 582 be somewhere in the neutral slot. At that time the gaps in the segment members 669 and 670 are vertical, permitting switch 661 and/or 662 to be actuated. This construction prevents the possibility of the gears in transmissions 553 and 554 failing to act in unison through the picking up of either transmission from neutral when the other is in gear. The cams 675 and 676 are indicated to show the breaker mechanism for the low tension circuit of spark coils 677 and 678. The pilot lights 681 and 682 are connected in the circuit by the ignition switches, as shown, so that the operator will know at a glance which engine is operating should one be cut out, without having to look at the ignition switches.

Figure 33:
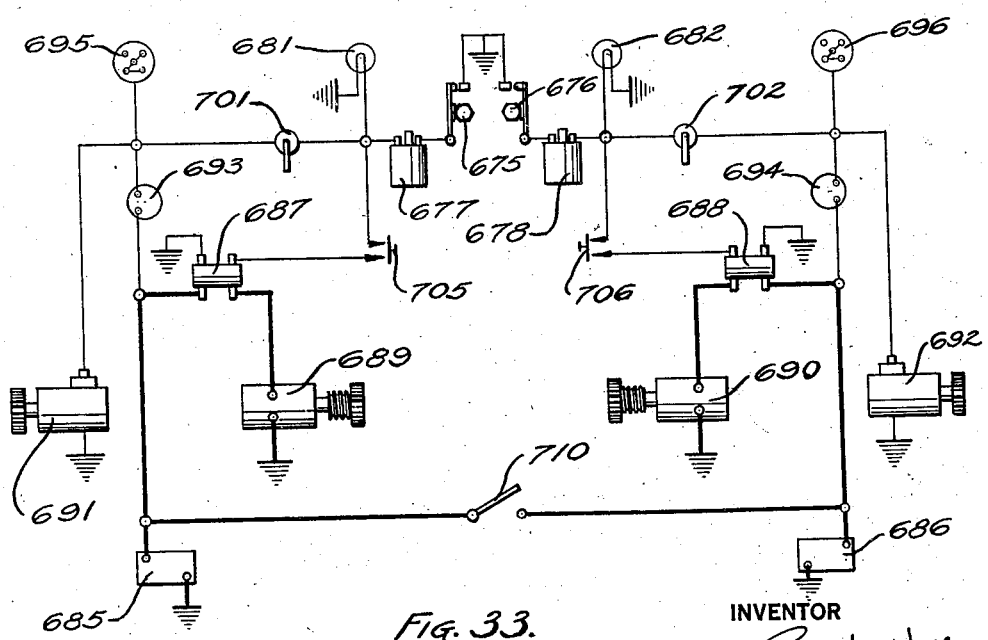

It is proposed to use a generator on each of engines 105 and 106, same being indicated in Fig. 26 as 691 and 692. Referring to Fig. 33, the wiring diagram for the power plant in Fig. 26 is shown, including these generators. The batteries 685 and 686 have a line running to the solenoid or remote control switches 687 and 688 and from these switches the current is completed to the starting motors 689 and 690. Between the generators 691 and 692 and the battery circuits are located the ammeters 693 and 694. A lighting switch 695 and 696 is included in the circuit as shown. The ignition switches 701 and 702 pass current through coil 677 and breaker mechanism 675. The pilot lights 681 and 682 again indicate which engine is in use. The button switches 705 and 706 energize the solenoids of the switches 687 and 688 at which time the starting motors 689 and 690 operate. It will be seen that the entire electrical mechanism is divided into two parts, each one serving one engine and the lighting switches 695 and 696 are intended to control the individual lighting circuit on each side of the vehicle. In the event that one engine should not be in use, it would be necessary for the battery on that side to furnish current for lighting without replenishment from its generator. Should it be desired to throw the capacity of both batteries into use under these conditions, the switch 710 can be closed whereby the current from both batteries 685 and 686 is placed in parallel and available for common use in both circuits.

In Fig. 34 a single control system is shown incorporating the various units previously described. It will be seen that the handle 715, attached to shaft 716 controls the ignition switches 701 and 702, same being mechanically connected together. The contact blade 718 is actuated by shaft 716 and if lever 715 is moved either to the right or to the left, batteries 685 and 686 can be placed in parallel. In the position shown, they are isolated electrically from each other. The remote control switches 705 and 706 are tied together so that they can be operated from the single push button 707. The contact blade 718 is shown more clearly in Fig. 35 where it will be noted that it is in the "off" position, also shown in Fig. 34. If moved to the right the circuit is bridged between contacts 719 and 720, this position being such that the right engine can operate since ignition switch 702 has completed the ignition circuit in this position. When the lever 715 is moved to the left so that contacts 721 and 722 are bridged, the left engine can now run due to the completion of the ignition circuit through switch 701. As previously described in connection with Fig. 33, the ignition circuit must be completed before the particular engine can be started since the branch of the remote control switch is after the ignition switch. When thus operating lever 715 to the right or left the various functions are coordinated, thus obviating the separate operation of switch 710, in Fig. 33. When both engines are running, it is desirable that each electrical system function separately and when the lever 715 is rotated counter-clockwise so that the contact blade assumes the position "R—L," the battery circuits are again entirely independent.

At the end of shaft 716 is located the cam 730 with the hump 731. When blade 718 has assumed the position "R—L," corresponding to the operation of both engines, the hump 731 depresses the tappet 732 at the extreme end of cable 733. The latter is housed in the flexible conduit 734. A spring 735 holds tappet 732 in contact with cam 730. Brackets 736 and 737 support the conduit 734. The other end of cable 730 is provided with the pin 740 which enters the slot at the end of lever 741 and also anchors the end of rod 68 which controls the air valve 66 at its other extremity. Actuation of cable 733 at the time when both engines are in operation results in the raising of pin 740 in lever 741 whereby a greater stroke is imparted to rod 68 and permitting a greater flow of air to the clutch actuating cylinder 320. Should it be desirable to maintain two batteries in parallel at a time other than when both engines are operating, the construction shown in Fig. 36 is outlined. The continuous contact bar 745 and 746 permits the bridging of the battery circuits in the left, "off," and right positions, but interrupts the circuits in the "R—L" position when both engines are operating. It will be noted that shaft 716 has a cylinder 748 mounted on its extremity, the notch 750 in contact with barrel 748 and in the position shown air flow through valve 753 to the clutch actuating cylinder 320 is restricted. When both engines are in operation, stem 754 drops into the notch 750 permitting valve 753 to be fully open.

Figure 37:
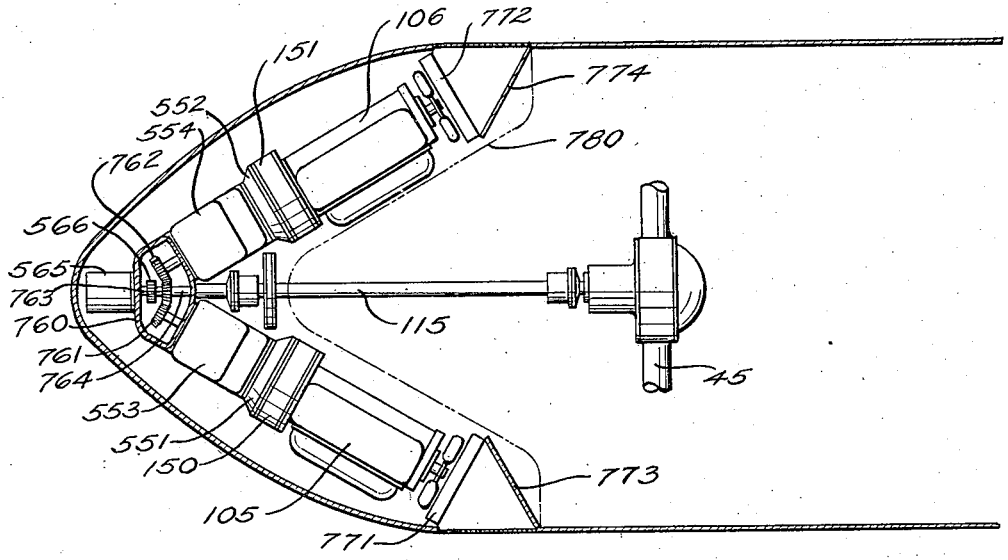
Figure 38:
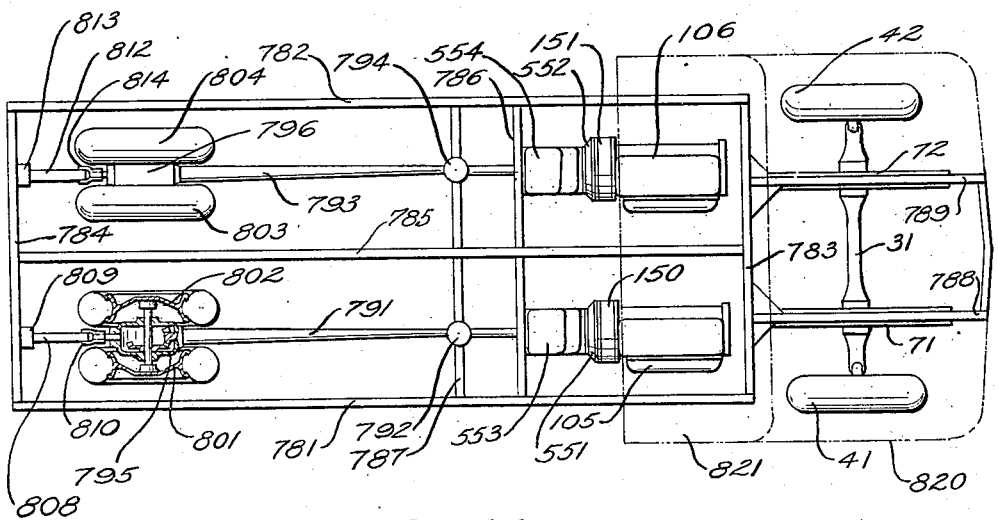

The clutch actuating system for two engines, together with the transmission control for two transmissions can be incorporated in the vehicles illustrated in Figs. 37 and 38. It will be noted in the former that engines 105 and 106 are mounted at an angle. Transmissions 553 and 554 are united by the transfer case 760. The gear train consists of bevel gears 761 and 762 and 763, the latter being mounted on shaft 764 which drives the generator 565 and has a sprocket 566 available for driving other accessories such as the air compressor. The radiators 771 and 772 are located at each side at an angle to the longitudinal axis of the vehicle. They are substantially at right angles to the crank shaft center lines of the engines. A shroud 773 and 774 permits entry of outside air to the radiator cores through openings in the body sides. The contour of the rear seat 780 is indicated where it closes in the power plant so that the projected area of the the vehicle can be completely utilized.

In Fig. 38 the two engines 105 and 106 are mounted in the frame whose side rails 781 and 782 are united by the end members 783 and 784. The center frame member 785, of considerable depth, acts as a backbone for the frame. Cross member 786 supports the back end of transmissions 553 and 554 or can be located closely to them. The cross member 787 supports the torque tube 791 at its forward end where it terminates in the ball joint 792. Similarly, torque tube 793 is supported by the ball end 794. The torque tubes 791 and 793 terminate in the housings 795 and 796 wherein are located the driving bevel gears mounted upon a short cross shaft which projects at each side from the housing 795 and 796. Wheels 801 and 802 are mounted on the right unit and wheels 803 and 804 are mounted on the left unit. Cantilever spring 808 anchored on the bracket 809 projects forward to the housing 795 and is secured thereto by the member 810 which permits oscillation of the housing 795 to permit the wheels to continually contact with the road regardless of contour and permits compensation for the movement at the end of spring 808 in the way of elongation and contraction. The anchorage to the housing can be made at its top, bottom or side or any point in between. A similar spring 812 held in anchorage 813 is united to housing 796 by the connection 814.

The front end of the vehicle consists of the side rails 788 and 789 below which is located front axle 31, to which it is secured through the intermediary of spring 71 and 72. The cab 820 is mounted over the forward wheels and the seat box 821 is located over the cylinder blocks of engines 106 and 105. With a relatively long pair of engines, the seat box 821 can be extended to include the seat proper and a sleeping compartment to the rear of same.

The transmissions 553 and 554 are actuated by the transmission control previously described. The clutches of engines 105 and 106 are controlled by the system shown in Figs. 9 and 10.

In view of the different engine and transmission combinations described, the use of different speed ratios in the transmission will depend on the operating characteristics of the vehicle. Where normally both engines will be in continuous use a three speed and reverse transmission might suffice. Where one engine will be used at times, a four speed transmission would be more desirable in order that the relatively smaller engine output can be better adapted to the operating requirements. When both engines are working, the lowest or lower speed ratios need not necessarily be used. The possible interchangeability of transmissions permits the selection of the one with the most desirable characteristics.

While I have shown bevel gearing in my transfer case, it will be understood that any type of train of gears can be utilized to effect the combination of the outputs of a plurality of engines. Furthermore, the bevel gearing can be of any desirable type such as straight tooth, spiral bevel or hypoid.

In the foregoing description and the accompanying drawings I have described and illustrated practical embodiments of the several novel features of the present disclosure, which I believe to be admirably adapted to accomplish the purposes heretofore related in an efficient and reliable manner. It is however, to be understood that subsequent developments in the art may necessitate departures from the particular construction, mounting and arrangement of the several units as herein described. Accordingly it is to be understood that I reserve the privilege of resorting to all such legitimate structural modifications and variations in mounting, arrangement and method of assembly of the several units, as may fairly be comprehended within the spirit and scope of the appended claims.

I claim:

1. In combination, a pair of prime movers, individual clutches for said prime movers, and operating means therefor including means for synchronizing the operation of said clutches.

2. In combination, a pair of prime movers, individual clutches for said prime movers, a common operating means for said clutches, and means for automatically pre-conditioning said operating means for synchronous operation of said clutches.

3. In combination, a pair of prime movers, individual clutches for said prime movers, a common operating means for said clutches, and means automatically compensating for inequalities in adjustment or wear of said clutches to effect synchronous operation.

4. In combination, a pair of prime movers, individual clutches for said prime movers, and fluid controlled means for simultaneously and synchronously actuating said clutches.

5. In combination, a pair of prime movers, individual clutches for said prime movers, fluid controlled actuating means for said clutches, said actuating means including means for equalizing and synchronizing the operation of said clutches.

6. In combination, a pair of prime movers, individual clutches for said prime movers, fluid controlled actuating means for said clutches, including means automatically responsive to relative differences in adjustment or wear of said clutches to effect their synchronous operation.

7. In combination, a pair of prime movers, individual clutches for said prime movers, means for selectively or simultaneously operating said clutches, including means for synchronizing simultaneous clutch operation, and means for nullifying the functional effect of said synchronizing means in the selective operation of said clutches.

8. In combination, a pair of prime movers, individual clutches for said prime movers, fluid controlled operating means for said clutches, means for synchronizing simultaneous clutch operation, means for rendering said clutch operating means selectively ineffective to operate one of said clutches, and means for nullifying the functional effect of said synchronizing means in the selective operation of said clutches.

9. In combination, a pair of prime movers, individual clutches for said prime movers, means for simultaneously operating said clutches including means for synchronizing the operation thereof, means for rendering said clutch operating means selectively ineffective to operate one of said clutches, and means for rendering said synchronizing means ineffective during the operation of the other clutch.

10. In combination, a pair of prime movers, individual clutches for said prime movers, fluid controlled means for actuating said clutches including means for synchronizing simultaneous clutch operation, means for rendering said clutch actuating means selectively ineffective to operate one of said clutches, and means for rendering said synchronizing means ineffective during the operation of the other clutch.

11. In a vehicle, a plurality of engines, an independent electrical control circuit for each engine, and optionally operable means for combining said circuits into a single unitary control system.

12. In a vehicle, a pair of prime movers operable singly or in unison, a transmission for each prime mover, and fluid pressure actuated means for controlling the operation of said transmissions.

13. In a vehicle, a pair of prime movers operable singly or in unison, a transmission for each prime mover, and fluid pressure actuated means for selectively or simultaneously controlling the operation of said transmissions.

14. In a vehicle, a pair of internal combustion engines operable singly or in unison, a transmission for each engine, fluid pressure actuated means for selectively or simultaneously controlling the operation of said transmissions, an ignition circuit for each engine having a control switch and means effective during transmission of power by the respective transmissions, to prevent actuation of the corresponding ignition control switch.

15. In combination, a pair of prime movers, individual clutches for said prime movers, and means automatically responsive to variable mechanical inequalities of said clutches to effect simultaneous synchronous operation thereof.

16. In combination, a pair of prime movers, individual clutches for said prime movers, and fluid controlled means automatically responsive to variable mechanical inequalities of said clutches to effect simultaneous synchronous operation thereof.

17. In combination, a pair of prime movers, independently operable clutches individual to said prime movers, means common to both clutches for synchronizing simultaneous clutch operation, and means for nullifying the functional effect of said synchronizing means in the selective operation of said clutches.

18. In combination, a pair of prime movers, independently operable clutches individual to said prime movers, fluid controlled means common to both clutches for synchronizing simultaneous clutch operation, and means for nullifying the functional effect of said synchronizing means in the selective operation of said clutches.

19. In a vehicle, a pair of engines, a transmission individual to each engine, and means common to both transmissions for controlling the operation thereof.

20. In a vehicle, a pair of engines, a transmission individual to each engine, and fluid pressure actuated means common to both transmissions for controlling the operation thereof.

21. In a vehicle, a pair of engines, a transmission individual to each engine, and means common to both transmissions for rendering said transmissions selectively or simultaneously effective or ineffective for the transmission of power.

AUSTIN M. WOLF.